United States Patent
Garbon et al.

(10) Patent No.: US 9,827,510 B2
(45) Date of Patent: Nov. 28, 2017

(54) HYDRODYNAMIC SEPARATOR

(71) Applicants: Joel A. Garbon, Portland, OR (US); Jordan S. Kahlenberg, Parkton, MD (US); Benjamin S. Farrell, Columbia, MD (US); Scott D. Perry, East Aurora, NY (US); Gregory W. Byrne, Jr., West Linn, OR (US)

(72) Inventors: Joel A. Garbon, Portland, OR (US); Jordan S. Kahlenberg, Parkton, MD (US); Benjamin S. Farrell, Columbia, MD (US); Scott D. Perry, East Aurora, NY (US); Gregory W. Byrne, Jr., West Linn, OR (US)

(73) Assignee: CONTECH ENGINEERED SOLUTIONS LLC, West Chester, OH (US)

( * ) Notice: Subject to any disclaimer, the term of this patent is extended or adjusted under 35 U.S.C. 154(b) by 42 days.

(21) Appl. No.: 14/961,418

(22) Filed: Dec. 7, 2015

(65) Prior Publication Data
US 2016/0160489 A1 Jun. 9, 2016

Related U.S. Application Data

(60) Provisional application No. 62/089,011, filed on Dec. 8, 2014, provisional application No. 62/241,488, filed on Oct. 14, 2015.

(51) Int. Cl.
*E03F 5/04* (2006.01)
*B01D 21/02* (2006.01)
(Continued)

(52) U.S. Cl.
CPC ......... *B01D 21/24* (2013.01); *B01D 21/0036* (2013.01); *B01D 21/02* (2013.01);
(Continued)

(58) Field of Classification Search
CPC ......... E03F 5/0403; E03F 5/0404; E03F 5/14; E03F 5/16; B01D 21/0036; B01D 21/02;
(Continued)

(56) References Cited

U.S. PATENT DOCUMENTS

| 4,985,148 A | 1/1991 | Monteith |
| 5,498,331 A | 3/1996 | Monteith |

(Continued)

FOREIGN PATENT DOCUMENTS

| KR | 10-0896015 | * 4/2009 |
| KR | 100896015 | 5/2009 |
| KR | 101036944 | 5/2011 |

OTHER PUBLICATIONS

PCT, International Search Report and Written Opinion, International Application No. PCT/US2015/064260; dated Apr. 22, 2016, 12 pages.

*Primary Examiner* — Christopher Upton
(74) *Attorney, Agent, or Firm* — Thompson Hine LLP

(57) ABSTRACT

A separator unit includes a tank defining an internal volume and having an inlet and an outlet. An insert separates the tank into an upper chamber and a lower chamber. The insert includes a weir at an upper side to define an intake area for receiving an influent liquid, a first opening in the intake area for delivering liquid down into the lower chamber and a second opening on an opposite side of the weir for delivering liquid from the lower chamber back up into the upper chamber. The separator may include one or more of the first opening being of arcuate shape, a perforated shroud extending downward from the insert within the lower chamber and/or an upflow pipe extending downward from the second opening into the lower chamber, a bottom of the upflow pipe covered, and a slot opening in a sidewall of the upflow pipe.

28 Claims, 23 Drawing Sheets

(51) Int. Cl.
    *B01D 21/24*   (2006.01)
    *B01D 21/00*   (2006.01)
    *E03F 5/16*    (2006.01)
    *C02F 103/00*      (2006.01)
    *C02F 1/00*        (2006.01)

(52) U.S. Cl.
    CPC ..... *B01D 21/2405* (2013.01); *B01D 21/2444* (2013.01); *E03F 5/0403* (2013.01); *E03F 5/16* (2013.01); *C02F 2001/007* (2013.01); *C02F 2103/001* (2013.01)

(58) Field of Classification Search
    CPC  B01D 21/2405; B01D 21/2444; B01D 36/04; C02F 2103/001
    USPC ..... 210/164, 170.03, 257.1, 299, 521, 532.1
    See application file for complete search history.

(56) References Cited

U.S. PATENT DOCUMENTS

| | | | |
|---|---|---|---|
| 5,725,760 A | 3/1998 | Monteith | |
| 5,753,115 A | 5/1998 | Monteith | |
| 5,759,415 A | 6/1998 | Adams | |
| 5,849,181 A | 12/1998 | Monteith | |
| 6,062,767 A * | 5/2000 | Kizhnerman | E03F 5/16 210/170.03 |
| 6,068,765 A | 5/2000 | Monteith | |
| 6,126,817 A | 10/2000 | Duran et al. | |
| 6,371,690 B1 | 4/2002 | Monteith | |
| 6,419,843 B1 | 7/2002 | Natarius | |
| 6,475,381 B1 | 11/2002 | Gustafsson | |
| 6,547,962 B2 | 4/2003 | Kistner et al. | |
| 6,780,310 B1 | 8/2004 | Howe | |
| 6,797,161 B2 | 9/2004 | Use et al. | |
| 6,802,962 B1 * | 10/2004 | Browne, III | E03F 5/06 210/164 |
| 6,913,155 B2 | 7/2005 | Bryant | |
| 6,951,619 B2 | 10/2005 | Bryant | |
| 7,182,874 B2 | 2/2007 | Allard et al. | |
| 7,297,266 B2 | 11/2007 | Cobb et al. | |
| 7,332,091 B2 | 2/2008 | Peters, Jr. et al. | |
| 7,344,636 B2 | 3/2008 | Faram et al. | |
| 7,378,027 B2 | 5/2008 | Zhou | |
| 7,470,361 B2 | 12/2008 | Eberly | |
| 7,507,333 B2 | 3/2009 | Meyermann | |
| 7,527,731 B2 | 5/2009 | Su et al. | |
| 7,582,216 B2 | 9/2009 | Arnott et al. | |
| 7,641,805 B2 | 1/2010 | Battan et al. | |
| 7,666,303 B2 | 2/2010 | Williams et al. | |
| 7,699,984 B2 | 4/2010 | Andoh et al. | |
| 7,722,763 B2 | 5/2010 | Benty et al. | |
| 7,951,294 B2 | 5/2011 | Duran et al. | |
| 8,142,666 B1 | 3/2012 | Happel | |
| 8,287,726 B2 | 10/2012 | Williams et al. | |
| 8,496,814 B2 | 7/2013 | Kent | |
| 8,663,466 B2 | 3/2014 | Braunwarth et al. | |
| 8,715,507 B2 | 5/2014 | Gulliver et al. | |
| 2005/0016905 A1 | 1/2005 | Lindow | |
| 2006/0283814 A1 | 12/2006 | Williamson et al. | |
| 2008/0185325 A1 | 8/2008 | Murray et al. | |
| 2011/0186492 A1 | 8/2011 | Holtz | |
| 2013/0306577 A1 | 11/2013 | Mayer et al. | |
| 2014/0110359 A1 | 4/2014 | Haywood et al. | |
| 2014/0374332 A1 * | 12/2014 | Hannah | E03F 5/0404 210/170.03 |
| 2015/0048014 A1 | 2/2015 | Anastasio et al. | |

* cited by examiner

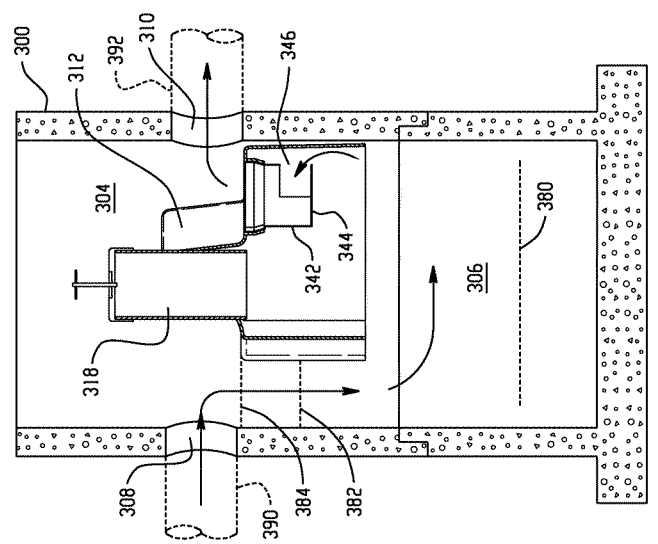
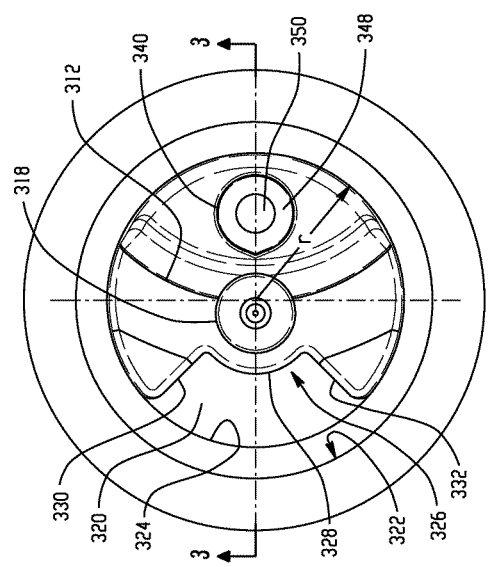
Fig. 3
Fig. 2

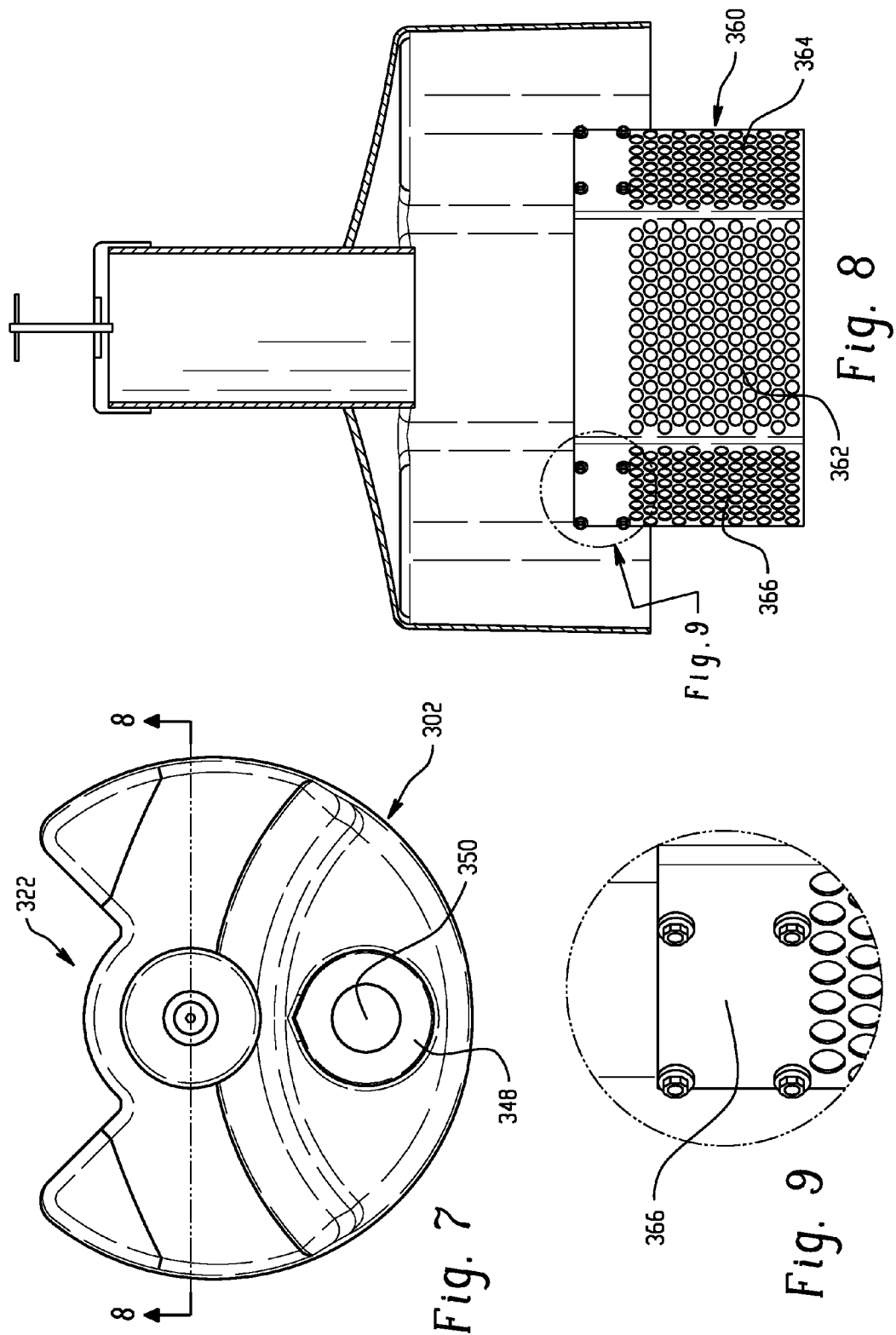

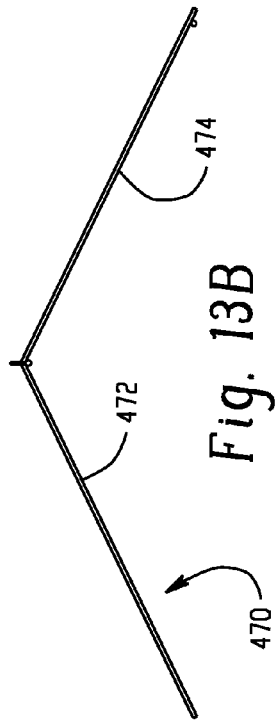
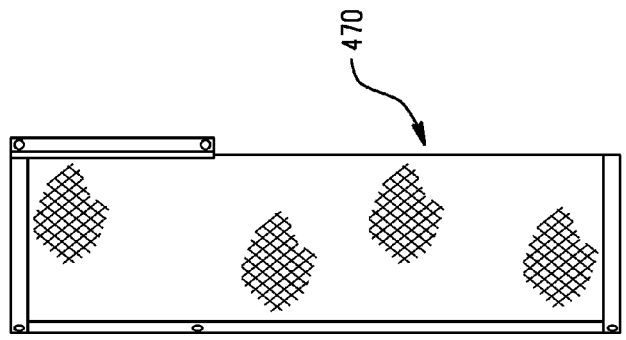
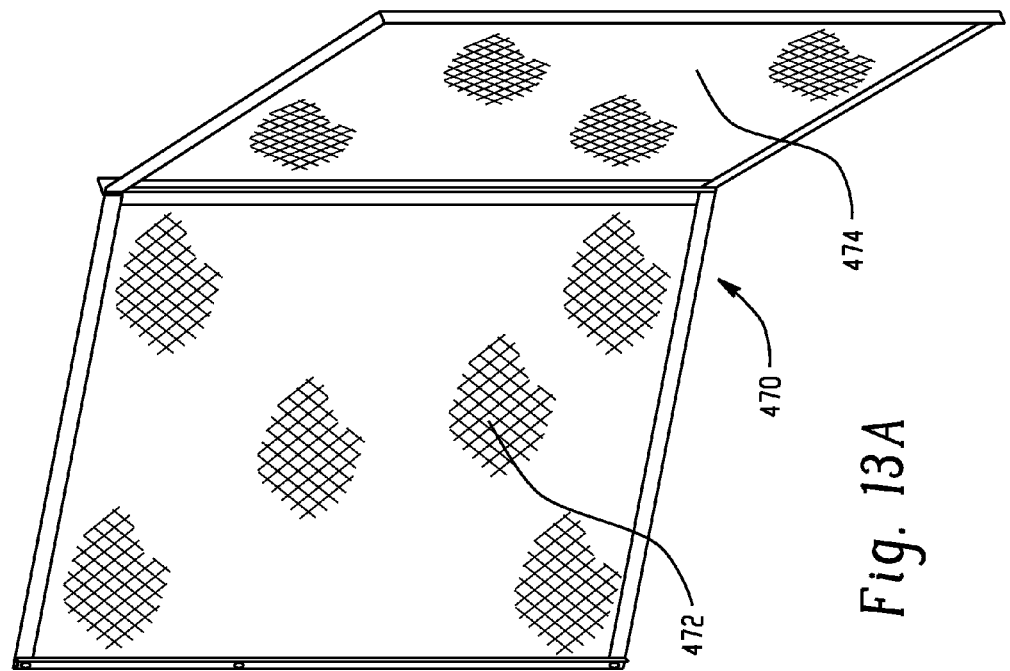
Fig. 13B
Fig. 13C
Fig. 13A

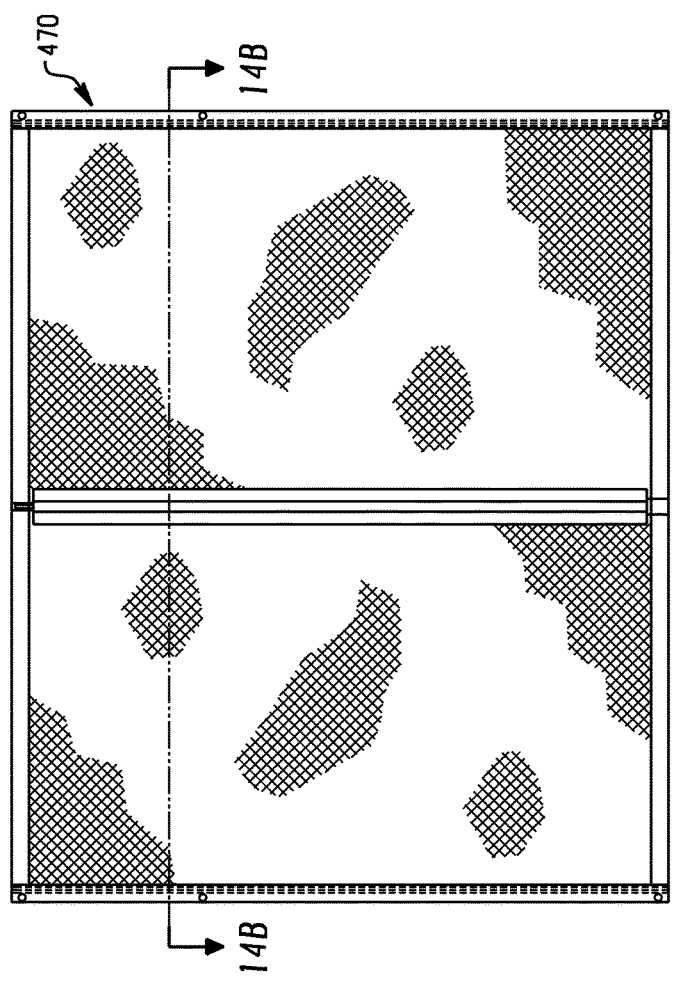
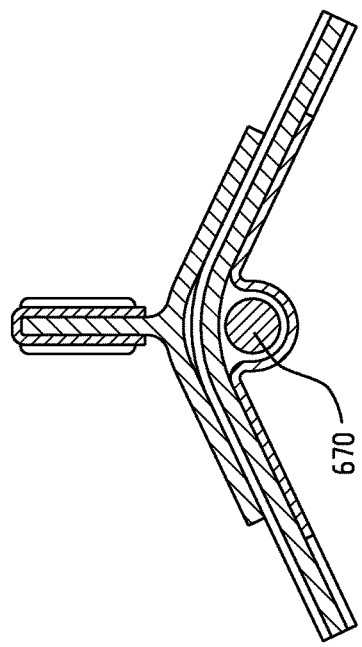
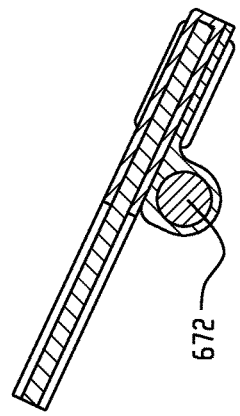
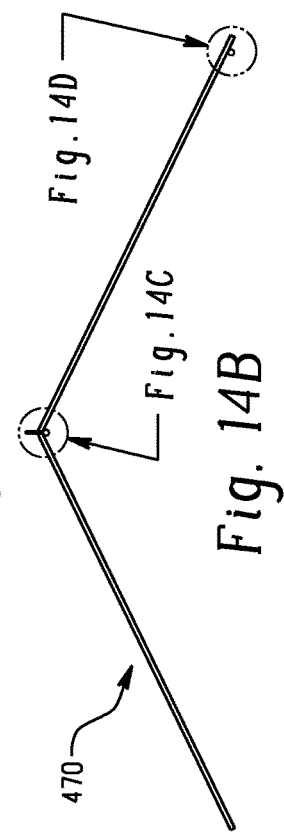
Fig. 14A
Fig. 14B
Fig. 14C
Fig. 14D

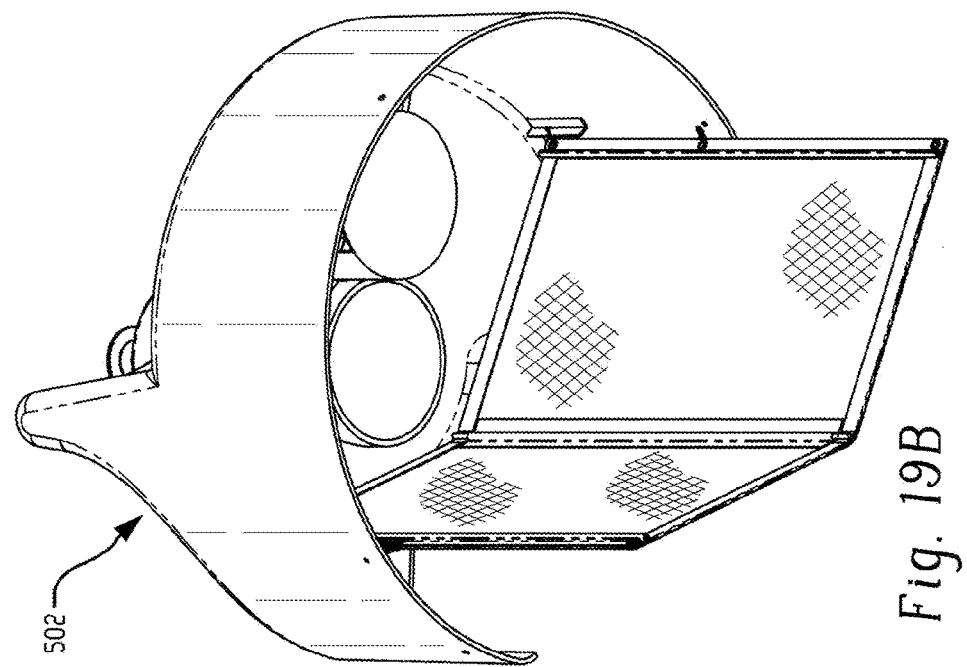
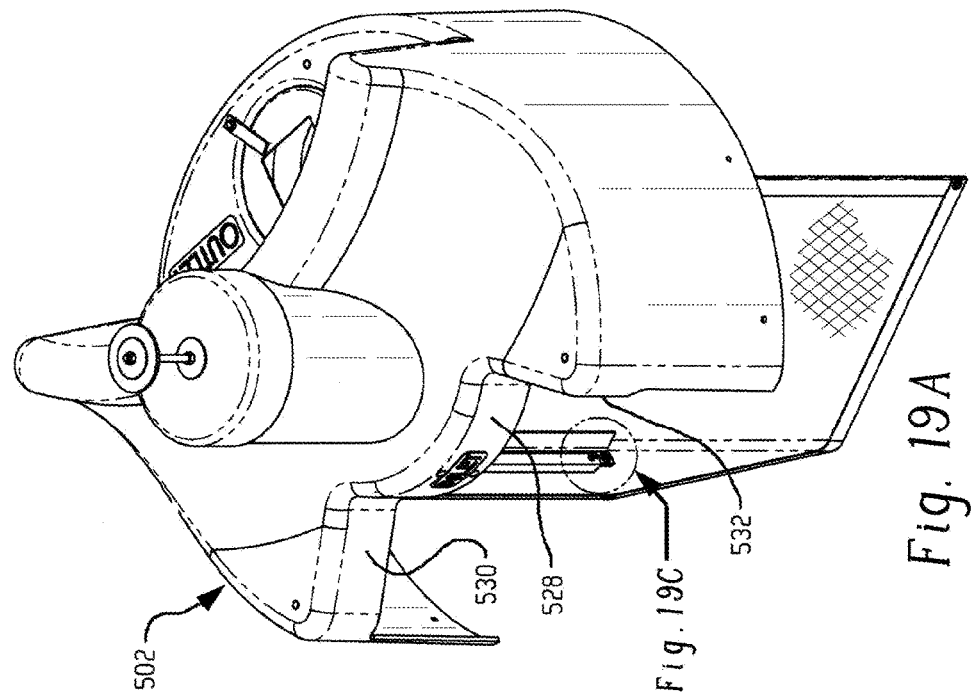
Fig. 19B
Fig. 19A
Fig. 19C

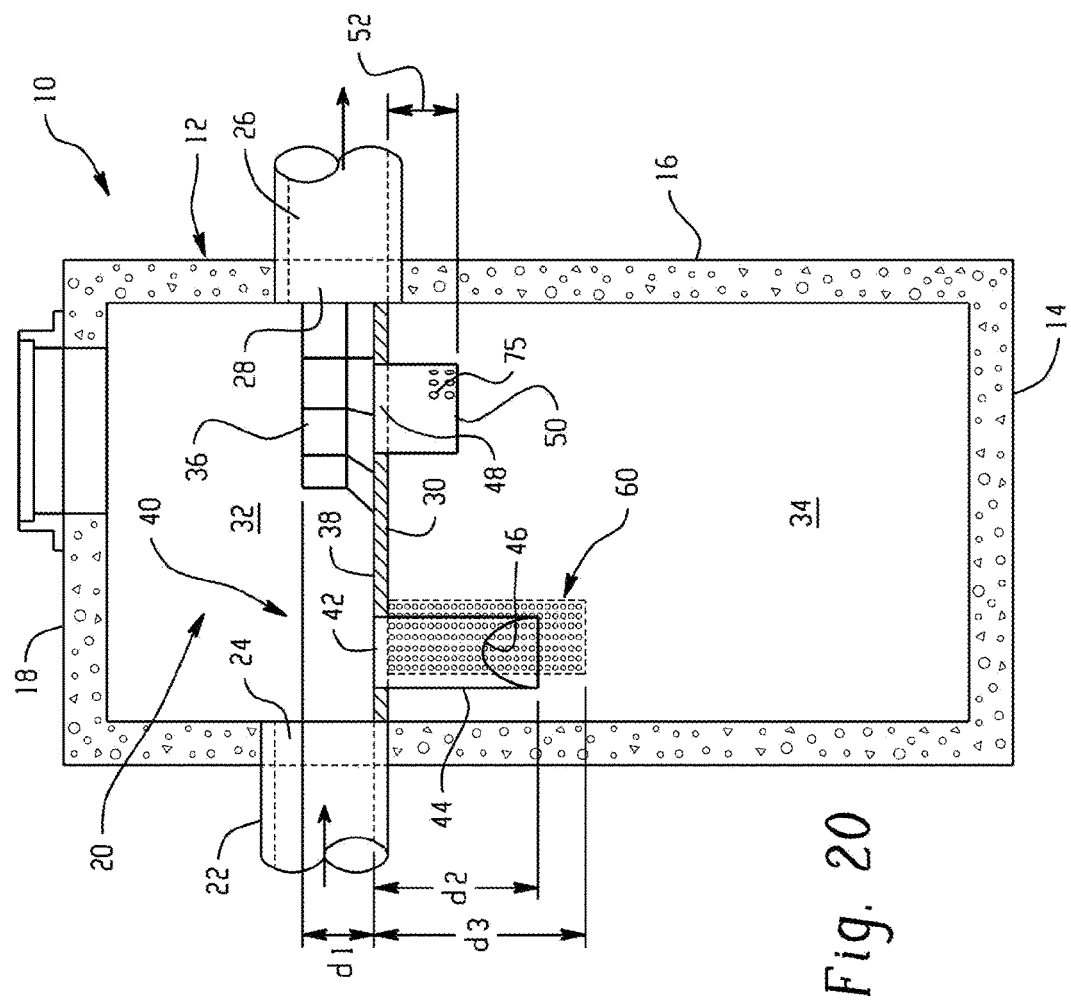
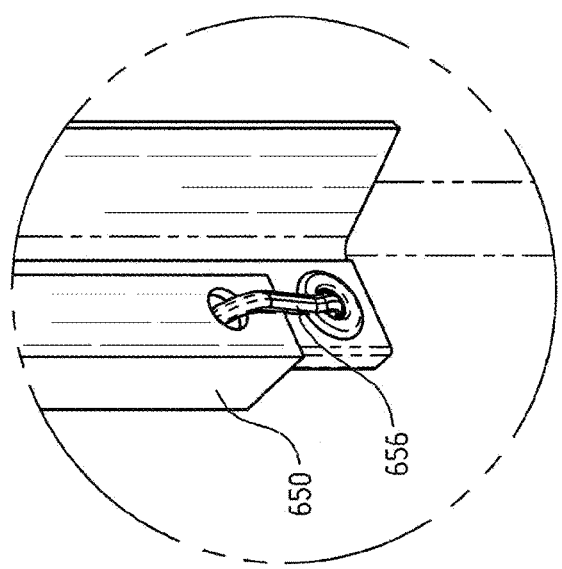
Fig. 20
Fig. 19C

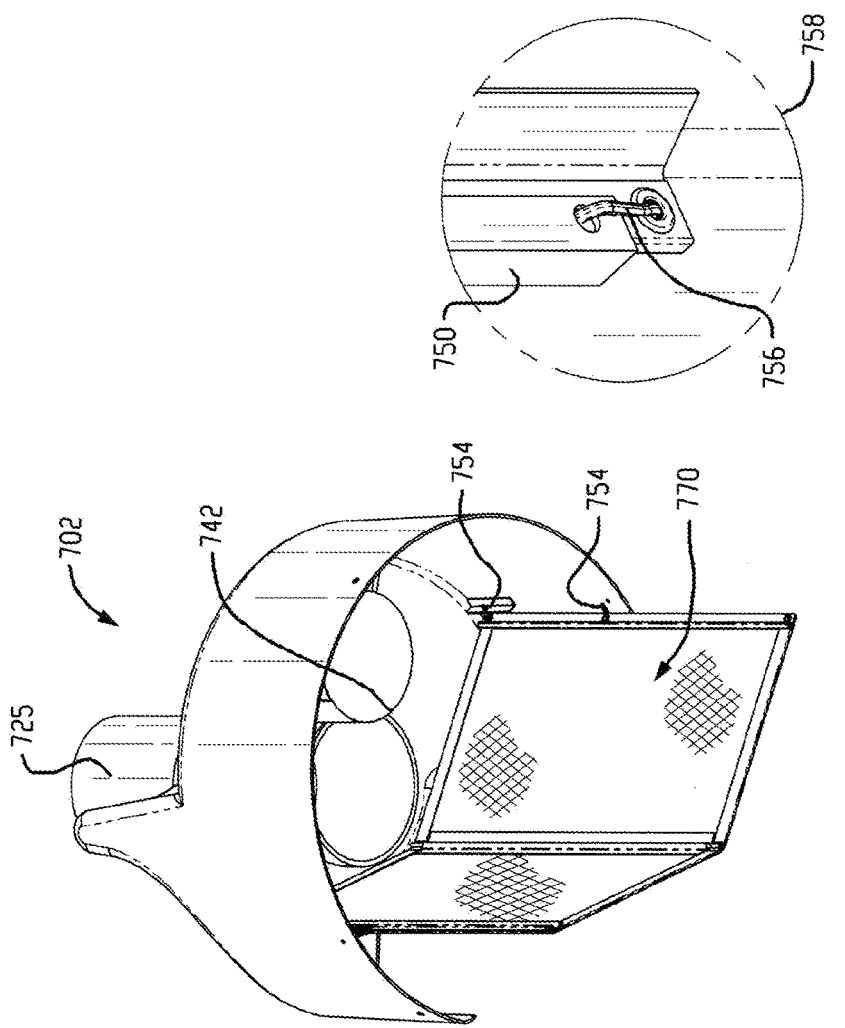
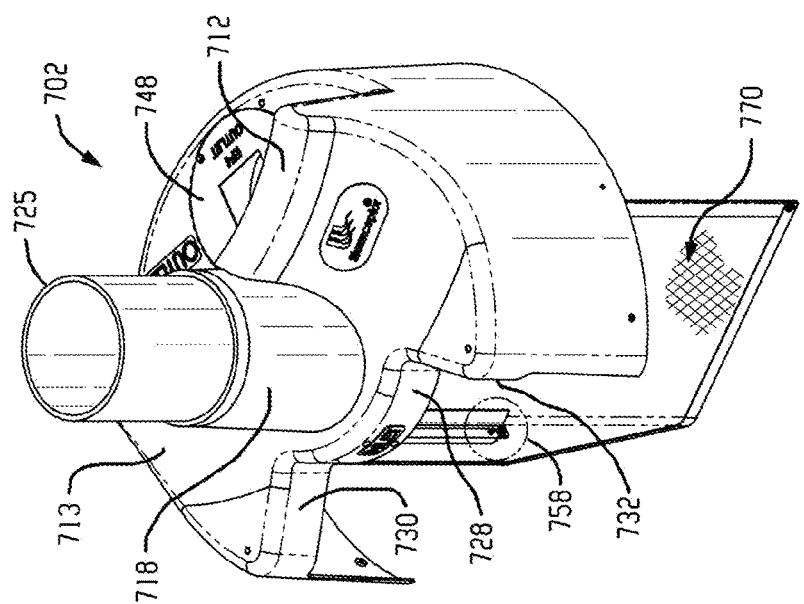

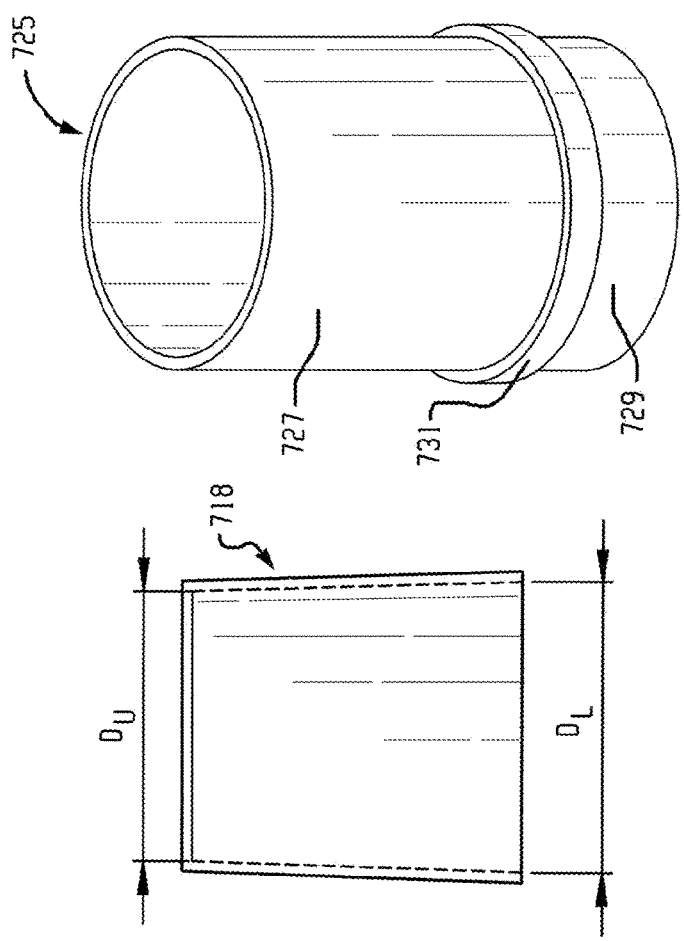
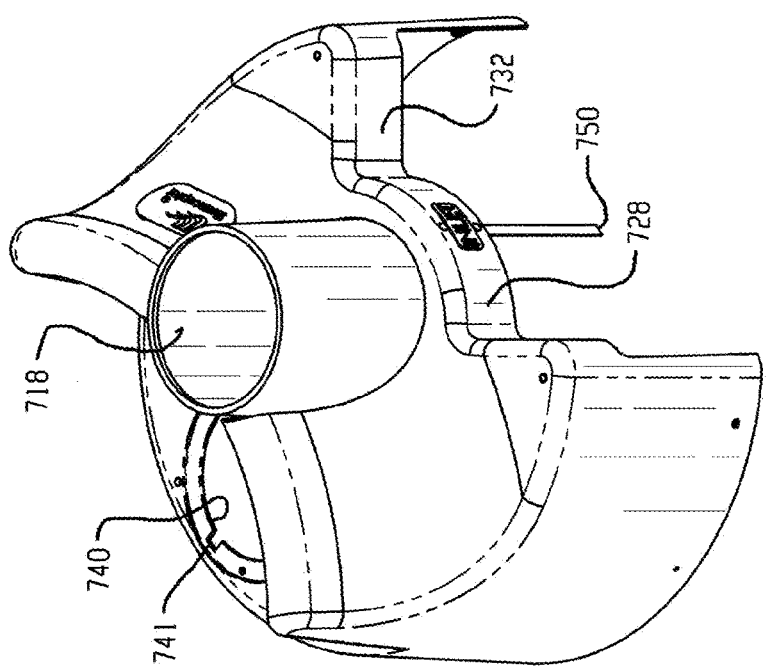

HYDRODYNAMIC SEPARATOR

TECHNICAL FIELD

This application relates generally to separator tanks that receive stormwater runoff, and, more particularly, to separator tanks having high sedimentation, floatables and/or debris removal and retention even in the case of high flow rates through their lower chambers.

BACKGROUND

The protection of ground water and natural bodies of water requires systems for diverting and/or treating water that contacts roadways, parking lots, and other man-made structures. If such diversion or treatment systems are not provided, particulates and other contaminants located on or forming part of such structures may be carried by drain water or stormwater to the natural water bodies and contaminate them. Local, state and federal laws and rules require municipalities, businesses and, in some instances, private entities, to establish means to reduce particulate and contaminant levels permissibly transferred to natural bodies of water from property under their control. Particular requirements may vary from jurisdiction to jurisdiction, but all are likely to become more, rather than less, stringent.

Most new land development plans and upgrades to existing paved surfaces involve the insertion of a preliminary separation system, generally for connection to the municipal water-handling infrastructure. Any preliminary separation system should be designed with the capability to receive fluid flowing in at a wide range of rates. It is desirable, then, to have a separation system capable of handling variable fluid flow rates with reduced likelihood of backup and flooding of the surface above. It is also desirable to control the flow through the system such that trapped particulates are not scoured or washed out of the device and re-entrained during high flows for passage downstream.

A variety of stormwater separation systems exist. These systems generally include a tank or container including a storage or treatment chamber within which, ideally, floating particulates are retained, and non-floating particulates are allowed to settle. The storage chamber includes an inlet for receiving untreated water, and an outlet for movement of treated water out of the chamber. The tank may also include a bypass arrangement to allow excess untreated water to exit the tank without passing through the storage chamber. In one implementation of such systems the storage chamber is located in a lower part of the tank and the bypass is located in an upper part of the tank, with an insert or deck located within the tank to separate the two chambers, the insert having one opening that defines the storage chamber inlet and another opening that defines the storage chamber outlet.

The device shown in U.S. Pat. No. 7,666,303 is exemplary of such a separator and utilizes a T-shaped drop tube at the storage chamber inlet to direct inflows into the storage chamber, a riser tube at the storage chamber outlet to define a floatables collection area in the upper part of the storage chamber and a weir atop the insert to direct incoming stormwater to the storage chamber. As flows through the storage chamber of such a separator system are increased (e.g., by raising the height of the weir), less stormwater flow bypasses, but potential for scouring and washout within the storage chamber increases.

Accordingly, it would be desirable to provide a separator with increased treatment flow capacity while at the same time incorporating one or more cost-effective features to limit scouring and washout.

SUMMARY

In one aspect, a separator unit includes a tank defining an internal volume and an insert within the tank and separating the tank into an upper chamber and a lower chamber. The insert includes a weir at an upper side of the insert to define an intake area for receiving an influent liquid, a first opening through the insert in the intake area for delivering liquid down into the lower chamber and a second opening through the insert on an opposite side of the weir for delivering liquid from the lower chamber back up into the upper chamber. The first opening is of arcuate shape.

In one implementation, the first opening has an outer arc formed by a portion of the tank wall and an inner arc formed by a downwardly extending arcuate panel of the insert.

In one implementations, the outer arc and inner arc extend through substantially the same circumferential extent.

In one implementation, the circumferential extent is between about 30° to about 150°.

In one implementation, the circumferential extent is between about 80° to about 100°.

In one implementation, the first opening includes first and second opposed and downwardly extending substantially planar panels of the insert that adjoin the arc panel.

In one implementation, a grate member overlies at least part of the first opening.

In one implementation, the grate member is mounted for movement between a lowered position and a raised position.

In one implementation, a perforated member extends downwardly from the insert into the lower chamber, the perforated member having a lower end that is higher than a bottom of the tank.

In one implementation, the perforated member is a rigid, non-movable member.

In one implementation, the perforated member comprises a flexible material and is mounted to permit some movement under flow conditions through the lower chamber.

In one implementation, the flexible material comprises a 3-dimensional geotextile material.

In one implementation, the perforated member is of substantially a V-shape in top plan view, with a point of the V-shape located proximate the first opening.

In one implementation a perforated member is positioned substantially horizontally in one or more of the lower chamber, atop the drop chute and/or within a vertical extent of the drop chute.

In one implementation, the second opening includes an orifice plate insert with a rectangular flow control opening.

In one implementation, an upflow pipe extends downward from the second opening into the lower chamber, a bottom of the upflow pipe covered, and a slot opening in a sidewall of the upflow pipe.

In one implementation, the slot opening spans no more than one half of a circumference of the upflow pipe, where a circumferential midpoint of the slot opening faces the tank wall at a point 180° from a midpoint of the arc-shaped first opening.

In another aspect, a separator unit includes a tank defining an internal volume and having an inlet and an outlet. An insert within the tank separates the tank into an upper chamber and a lower chamber. The insert includes a weir at an upper side of the insert to define an intake area for receiving an influent liquid, a first opening through the insert in the intake area for delivering liquid down into the lower chamber and a second opening through the insert on an opposite side of the weir for delivering liquid from the lower chamber back up into the upper chamber. A perforated shroud extends downward from the insert within the lower chamber and having a lower end positioned above a bottom of the lower chamber, wherein at least some liquid passes through the perforated shroud as such liquid flows through the lower chamber in order to reach the second opening.

In another aspect, a separator unit includes a tank defining an internal volume. An insert within the tank separates the tank into an upper chamber and a lower chamber. The insert includes a weir at an upper side of the insert to define an intake area for receiving an influent liquid, a first opening through the insert in the intake area for delivering liquid down into the lower chamber and a second opening through the insert on an opposite side of the weir for delivering liquid from the lower chamber back up into the upper chamber. A perforated shroud extends downward from the insert within the lower chamber and having a lower end positioned above a bottom of the lower chamber, where at least some liquid passes through the perforated shroud as such liquid flows through the lower chamber in order to reach the second opening.

In another aspect, a separator unit includes a tank defining an internal volume. An insert within the tank separates the tank into an upper chamber and a lower chamber. The insert includes a weir at an upper side of the insert to define an intake area for receiving an influent liquid, a first opening through the insert in the intake area for delivering liquid down into the lower chamber and a second opening through the insert on an opposite side of the weir for delivering liquid from the lower chamber back up into the upper chamber. An upflow pipe extends downward from the second opening and includes a tubular wall with a first side facing toward the first opening and a second side facing away from the first opening, wherein the first side is a solid wall configuration and the second side includes at least one opening for permitting liquid to leave the lower chamber and enter the rise pipe to flow up to the second opening.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 2 is a top view of the separator unit of FIG. 1;
FIG. 3 is a cross-section of the separator unit of FIG. 1;
FIG. 7 is a top view of the insert of FIG. 4C;
FIG. 8 is a cross-section of the insert of FIG. 7;
FIG. 9 is an enlarged view of a portion of FIG. 8.

FIGS. 13A, 13B and 13C are perspective, top and side views respectively of a perforated shroud used in the separator of FIG. 10A;
FIGS. 14A and 14B are front and cross-section views of the perforated shroud used in the separator of FIG. 10A;
FIGS. 14C and 14D are enlarged views of respective portions of the cross-section of FIG. 14B;
FIGS. 19A, 19B and 19C are perspective views of another embodiment of a combined insert and perforated shroud;
FIG. 20 is a cross-section of another embodiment of a separator;
FIGS. 27A-27C show another embodiment of a deck insert assembly;
FIG. 28 shows the deck insert assembly of FIG. 27A with orifice plate, perforated shroud and maintenance pipe extension all removed;
FIG. 29 shows a side elevation of the maintenance pipe of the deck insert assembly of FIG. 27A;
FIG. 30 shows a perspective view of the maintenance pipe extension of the deck insert assembly of FIG. 27A.

DETAILED DESCRIPTION

Figure 1:
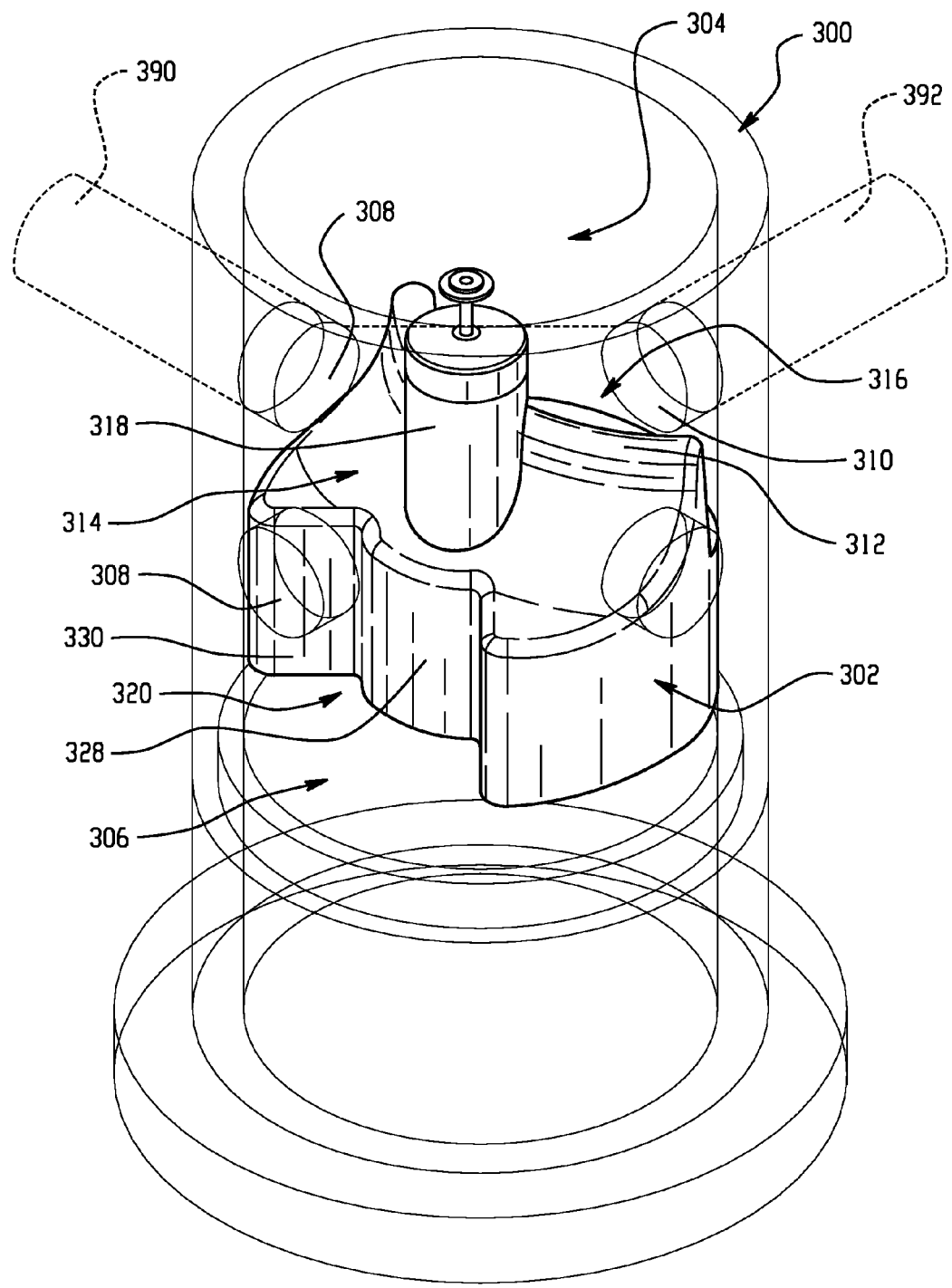
FIG. 1 is a perspective view of one embodiment of a separator unit.
Figure 4C:
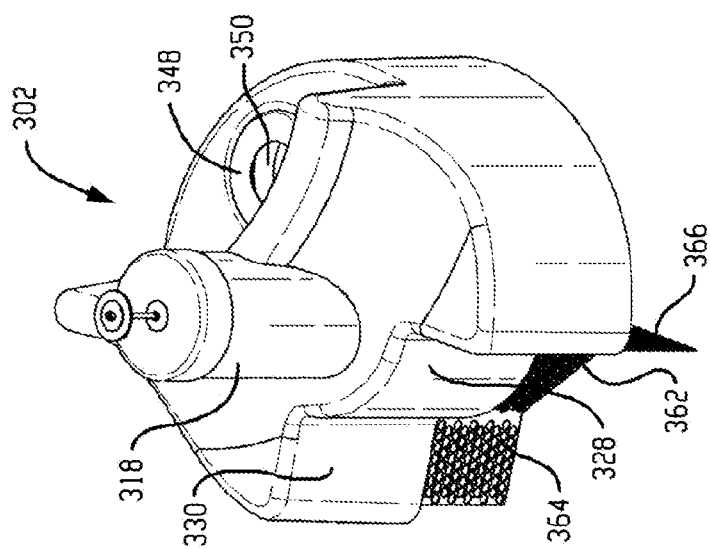
FIGS. 4A, 4B and 4C are perspective views of an insert used in the separator unit of FIG. 1.
Figure 4B:
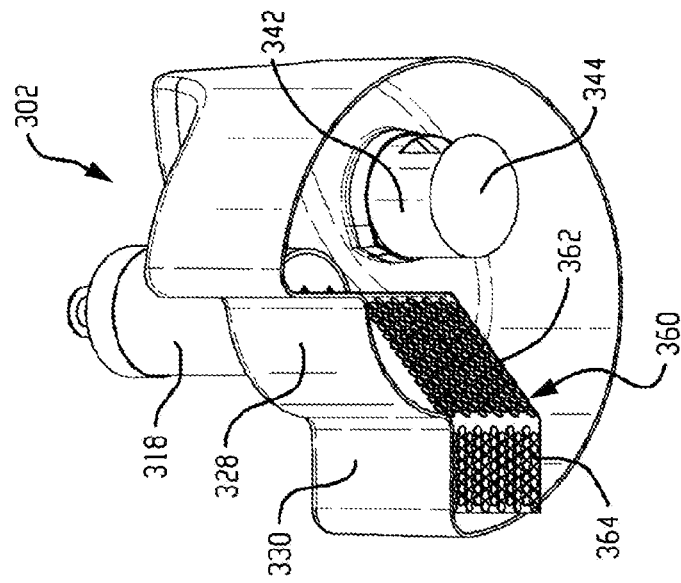
Figure 4A:
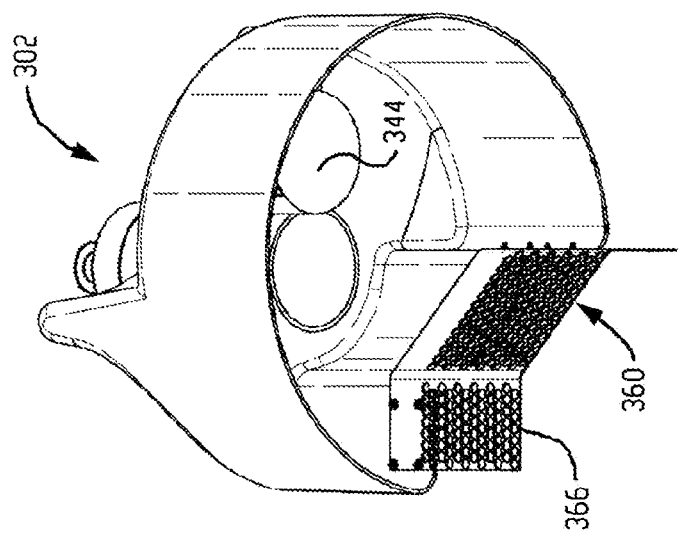
Figure 6:
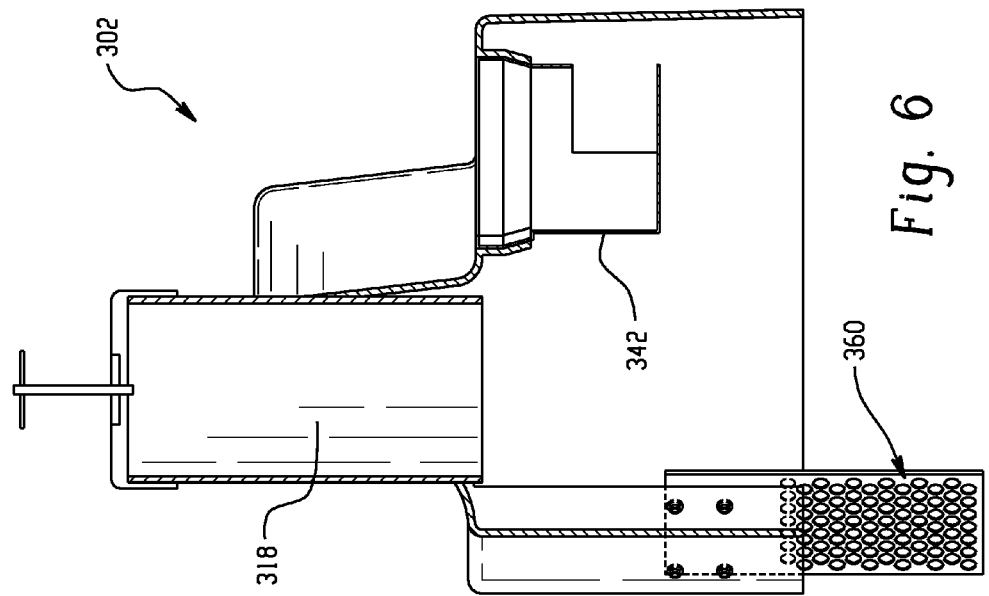
FIG. 6 is a side elevation of the insert of FIG. 4C.
Figure 5:
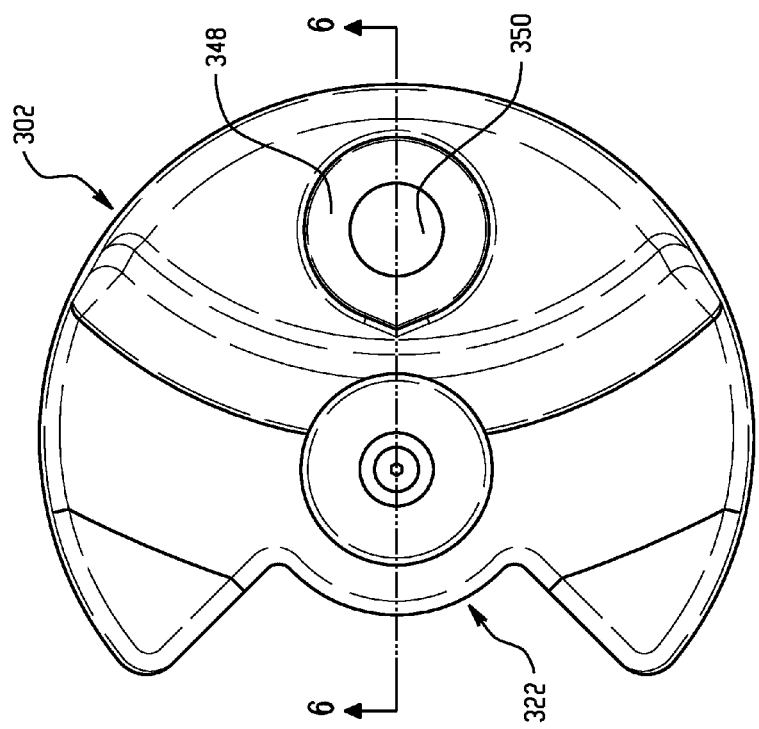
FIG. 5 is top view of the insert of FIG. 4C.

Referring to FIGS. 1-3, a separator includes a tank 300 with a deck insert 302 that divides the tank into an upper chamber 304 and a lower chamber 306. The deck insert 302 may, by way of example, be of fiberglass construction and be attached to the tank sidewalls by brackets, fasteners or other suitable structure, but other variations are possible. The tank includes one or more sidewall inlets 308 and a sidewall outlet 310. Exemplary inlet pipe 390 and outlet pipe 392 are shown in dashed line form. In one example the tank may be of cylindrical concrete manhole type configuration, but other tank structures are possible. The insert includes a curved weir 312 that extends across the insert, with the inside of the curve facing the outlet 310. The weir 312 divides the top of the insert into an upstream (inlet) side 314 and a downstream (outlet side) 316. A maintenance cleanout pipe 318 is located at or near the center of the insert toward the inlet side of the weir and partially intersects the weir 312. The diameter of the pipe 318 may range from 8 inches to 30 inches, such as 12 to 16 inches, and is of suitable size and strength the allow for pollutant removal (e.g., using a suction pipe or hose that is inserted downward through the pipe 319.

The pipe 318 may be tapered (e.g., larger diameter at the bottom) for added strength and nestability of deck inserts before install into tanks. The inlet side 314 of the insert, including the inlet side of the weir 312, is sloped toward a drop chute opening 320 of the insert.

The drop chute opening 320 is formed as a large curved opening at the inlet side perimeter of the insert 302. This opening 320 is of arcuate shape, having an outer arc 322 (formed by a portion 324 of the tank wall) and an inner arc 326 (formed by a downwardly extending arcuate panel 328 of the insert). The two arcs 324 and 326 may be substantially concentric extend through substantially identical degrees of circumferential extent (e.g., that may range from 30° to 150°, and typically about 80° to about 100°, or about 90°). The radial width of this chute opening 320 may range from 0.25r to 0.50r, where r is the inside radius of the cylindrical tank. The chute opening 320 may be completed by two identical and opposing downwardly extending insert panels 330, 332 that adjoin the arc panel 328. Thus, the chute opening 320 may be a circumferential segment of an annulus, and the bottom of the chute opening and the top of the chute opening are substantially the same size. The depth of the drop chute 320 many range from 6 to 72 inches (e.g., 12 inches to 48 inches, such as about 18 to 24 inches).

The insert 302 has a circular opening 340 in the horizontal surface on the outlet side of the weir. This opening has a keyed slot and is designed to allow insertion of an upflow pipe 342 that extends into the lower treatment chamber 306. The upflow pipe 342 may be cylindrical with inside diameter equal to 0.5r (again, where r is the inside radius of the cylindrical tank). The length of the pipe 342 may vary depending on the length of the drop chute. The bottom of the pipe is closed off, such as by a solid circular plate 344, such that no flow may enter the bottom of the pipe 342. The pipe has a slot opening 346 that spans one-half (or less) of the circumference of the pipe, and with a slot height equal to 0.25r. The bottom of the slot opening 346 terminates at the solid circular plate 344 at the bottom of the pipe. The top of the slot opening 346 may be a minimum distance of 1 inch (e.g., from 3 to 6 inches) from the underside of the insert. The orientation of the upflow pipe is such that the circumferential midpoint of the slot opening faces the tank wall at a point 180° from the midpoint of the drop chute arc, which is the orientation with the greatest distance from the midpoint of the arc of the drop chute to the midpoint of the slot opening. Thus, the tubular wall of the pipe has one side facing toward the drop chute opening and an opposite side facing away from the drop chute opening, wherein the one side facing the drop chute is of a solid wall configuration (e.g., not liquid passes through) and the opposite side includes at least one opening for permitting liquid to enter the pipe 342 and leave the lower chamber 306 by flowing up to and out of the opening 340 of the insert 302.

An orifice plate 348 is inserted in the circular opening 340 in the insert atop the upflow pipe 342, and contains a flow control orifice 350 of dimensions specific to the design surface loading rate of the device. The shape of the orifice opening may be circular or some other shape. A non-circular shape (such as square) may be preferred to reduce the potential for vortex formation in the upflow pipe during flow conditions.

By way of example, the operation of the device is as follows. Stormwater is delivered into the unit through opening 308 at the upstream side of the weir 312 and is conveyed down through the drop chute 320 and into the lower treatment chamber 306, where gravity separation of sediment and oil occurs. The bottom of the drop chute 320 is at an elevation equal to, or lower than, the elevation of the top of the slot opening 346 in the backside of the upflow pipe 342 on the opposite side of the treatment chamber. The flow path through the drop chute 320 is downward, while the flow path into the slot opening 346 in the upflow pipe is across the chamber (back toward the drop chute opening) and upward. The combination of the distance between the bottom of the drop chute 320 and the upflow pipe opening 346, the downward direction of flow into the treatment chamber 306, and the required changes in direction of flow to reach the upflow pipe opening 346, imparts a long flow path that improves hydraulic efficiency and the separation of sediment from the influent prior to the entry of treated water into the upflow pipe slot opening 346. Sediment is preferentially deposited in the sump (floor) at or near the inlet side of the treatment chamber, under the drop chute 220. The large cross-sectional surface area of the drop chute 220 creates a pond with slow downward movement such that the average velocity of influent discharging from the bottom of the drop chute 320 is low enough to avoid significant re-suspension of accumulated sediment in the sump. Additionally, influent exiting the inlet 308 immediately contacts the pond formed by the drop chute 320, which serves to attenuate the lateral water velocity as it moves toward the upstream side of the weir 312, and thereby reduces the potential for "hydraulic jump" over the weir 312. The position of the maintenance cleanout pipe 318 also aids in incoming flow energy dissipation and avoiding hydraulic jump of incoming water over the weir.

Oil, other floatables and debris that are conveyed down through the drop chute 320 and into the treatment chamber 306 rise up or sink and are captured under the insert, with the oil storage capacity defined by the distance of the top of the slot opening in the upflow pipe from the underside of the insert. Treated water enters the upflow pipe 342 and discharges through the flow control orifice 350, onto the outlet side of the insert, and exits through the outlet 310.

During storm events with very high influent flow rates, the water elevation on the upstream side of the weir may exceed the height of the weir, and the excess flow passes over the top of the weir to the downstream side of the insert, and exits through the outlet pipe. This is an "internal bypass" feature.

In some embodiments the drop chute 320 may include an associated perforated downward extension or other type or screening configuration. In this regarding referring to FIGS. 4A-4C and 5-9 depict one such arrangement in which a perforated shroud 360 having three panel segments 362, 364 and 366 extends downward from the drop chute. The shroud 360 may be connected to and supported by the insert via suitable fasteners (e.g., bolts and nuts). In this example the perforated shroud may be of a metal plate construction, with side panel segments 364 and 366 extending from the middle panel segment toward the tank side wall in the vicinity of the drop chute and generally parallel with the insert panels 330 and 332. Thus, the perforated shroud 360 has a configuration that wraps toward the drop chute opening 322. However, other variations are possible.

Figure 12:
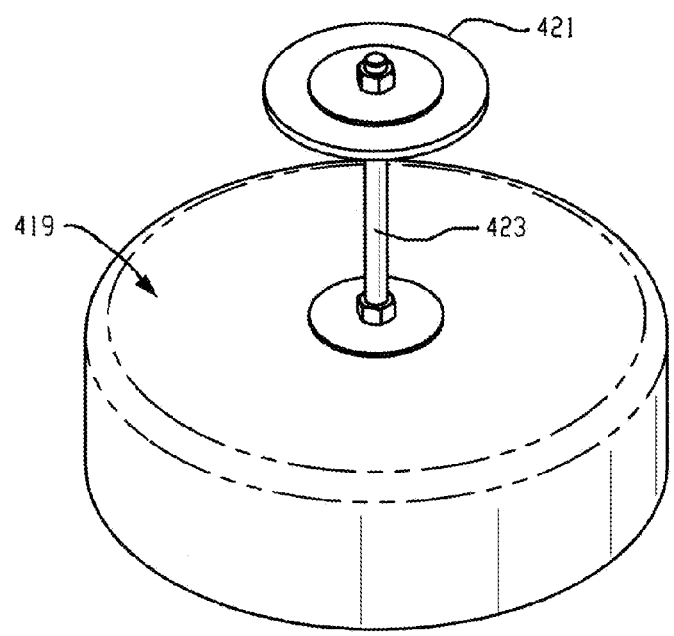
FIG. 12 is a perspective view of a cap member used in the separator of FIG. 10A.

In this regard, in another embodiment shown in FIGS. 10-18, a separator similar to the separator of FIGS. 1-9 is shown, but with a number of variations. The illustrated separator includes a tank 400 with a deck insert 402 that divides the tank into an upper chamber 404 and a lower chamber 406. The deck insert 402 may, by way of example be of fiberglass construction and be attached to the tank sidewalls by brackets or other suitable structure, but other variations are possible. The tank includes one or more sidewall inlets 408 and a sidewall outlet 410. In one example the tank may be of cylindrical concrete manhole type configuration, but other tank structures are possible. Exemplary inlet pipe 490 and outlet pipe 492 are shown in dashed line form in FIG. 10D. The insert 402 includes a curved weir 412 that extends across the insert, with the inside of the curve facing the outlet 410. The weir 412 divides the top of the insert into an upstream (inlet) side 414 and a downstream (outlet side) 416. The height of the weir above the outlet invert may vary depending on the design surface loading rate of the device or any tailwater conditions within the stormwater network, and is typically about 12 to eighteen inches, such as about 15 inches, but can vary as desired. A maintenance cleanout pipe 418 is located at or near the center of the insert toward the inlet side of the weir and partially intersects the weir 412. The diameter of the pipe 418 may range from 8 inches to 30 inches (e.g., about 12 inches in the case of six foot diameter tank 400). The height of the pipe may be such that the top end extends a minimum of about 4 inches above the top of weir 412 or obvert of the inlet and outlet pipe openings to prevent loss of previously captured floatable hydrocarbons during high flow bypass events. The bottom end of the pipe 418 may be at or about substantially the same elevation as the underside of the weir, and thereby permits oil and other floatable hydrocarbons to rise up inside the pipe 418 during inflow conditions and reduces the potential for entrainment and washout of previously captured floatable hydrocarbons through the slot opening 446 of the upflow pipe 442. The cleanout pipe 418 may be covered by a cap member 419 with associated handle 421 to facilitate removal and install as needed. The handle may be connected to the cap by a rod 423 as best seen in FIG. 12.

The inlet side 414 of the insert, including the inlet side of the weir 412, may be sloped toward a drop chute opening 420 of the insert. This configuration reduces the potential for sediment accumulation on the top side of the insert, and increases capture of both sediment and gross pollutants that may settle on the insert's surface during an event by directing these pollutants into the drop chute as flows subside.

The chute opening 420 is formed as a large curved opening (e.g., arcuate in shape and/or a circumferential segment of an annulus as described above, with the bottom of the chute opening and the top of the chute opening substantially the same size) at the inlet side perimeter of the insert. This opening 420 has an outer arc 422 (formed by a portion 424 of the tank wall) and an inner arc 426 (formed by a downwardly extending arcuate panel 428 of the insert). The two arcs 424 and 426 may be substantially concentric and extend through substantially identical degrees of circumferential extent $C_{420}$ (e.g., that may range from 30° to 150°, and typically about 80° to 100°, such as about 90°). The radial width $R_{420}$ of this chute opening 420 may range from about 0.25r to about 0.50r (such as about 0.50r), where r is the inside radius of the tank. The chute opening 420 may be completed by two identical and opposing downwardly extending insert panels 430, 432 that adjoin the arc panel 428. Thus, in certain implementations the open area of the drop chute 420 in top plan view (e.g., per FIG. 11B) may be on the order of about fifteen percent to about twenty percent total area of the tank in top plan view at the same height as the drop chute (e.g., the circular area within the tank in FIG. 10C). The depth of the drop chute 420 many range from 6 inches to 48 inches (e.g., such as about 16 to 24 inches, such as about 20 inches). The insert weir arc and drop chute arrangement accommodates multiple inlet pipes, and a wide range of inlet and outlet angles, largely dependent on unit diameter, pipe diameter and pipe material of construction.

The insert 402 has a circular opening 440 in the horizontal surface on the outlet side of the weir. This opening has a keyed slot and is designed to allow insertion (from the top) of an upflow pipe 442 that extends into the lower treatment chamber 406. The upflow pipe 442 may be cylindrical with inside diameter equal to about 0.4r to about 0.60r (such as about 0.5r). The length of the pipe 442 may vary depending on the length of the drop chute. The bottom of the pipe has a solid circular plate 444 such that no flow may enter the bottom of the pipe 442. The pipe 442 has a slot opening 446 that spans one-half (or less) of the circumference of the pipe, and with a slot height equal to about 0.20r to about 0.30r (such as about 0.25r). The bottom of the slot opening 446 terminates at the solid circular plate 444 at the bottom of the pipe. The top of the slot opening 446 may be a minimum distance of 6 inches from the underside of the insert. The orientation of the upflow pipe 442 is such that the circumferential midpoint of the slot opening faces the tank wall at a point 180° from the midpoint of the drop chute arc, which is the orientation with the greatest distance from the midpoint of the arc of the drop chute to the midpoint of the slot opening, increasing the unit's hydraulic efficiency and creating a longer flow path.

An orifice plate 448 is inserted in the circular opening 440 in the insert atop the upflow pipe 442, and contains a flow control orifice 450 of dimensions specific to the design surface loading rate of the device. The shape of the orifice opening may be square or rectangular, to reduce the potential for vortex formation in the upflow pipe during flow conditions, thereby reduce potential for short-circuiting or the creation of a vortex upflow that might cause resuspension of previously captured sediment. However, round openings are also contemplated. The orifice plate may be retained in place by one or more movable plate arms 451 that can be rotated from the illustrated retaining position (FIG. 15A) to a position alongside the outlet opening 440 to permit the orifice plate to be removed (e.g., and replaced with a plate having a different orifice size and/or shape if site conditions or requirements change).

Figure 17A:
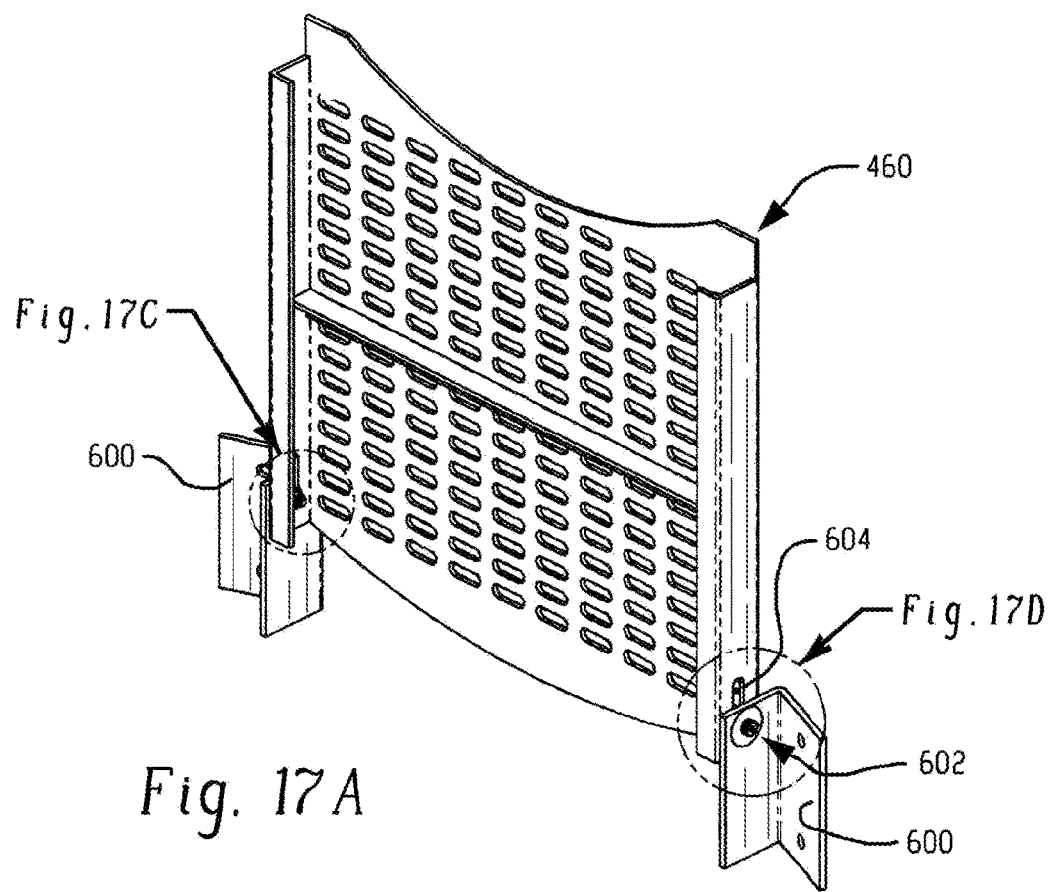
FIGS. 17A and 17B are perspective views of a grate assembly of the separator of FIG. 10A.
Figure 17B:
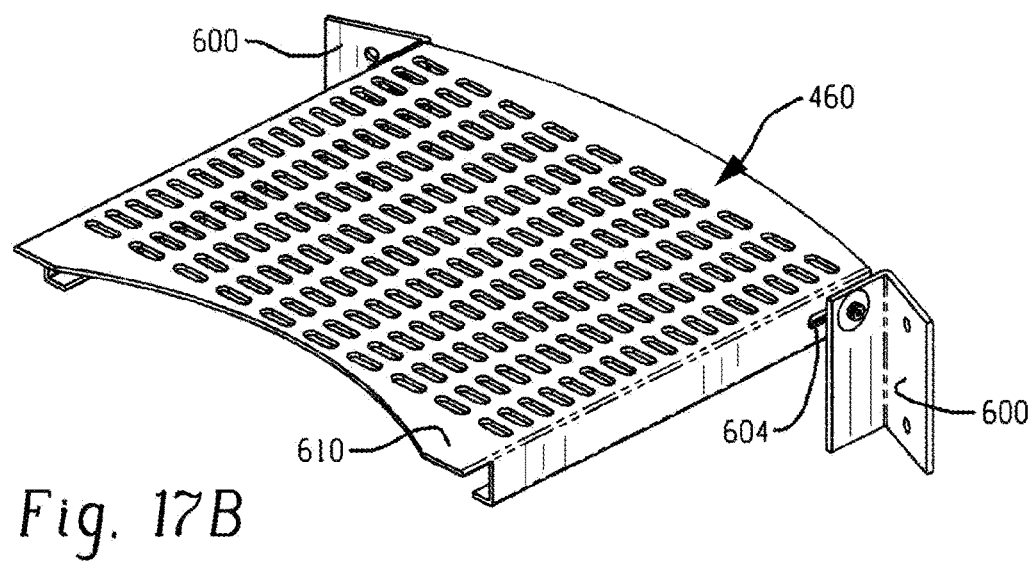
Figure 17C:
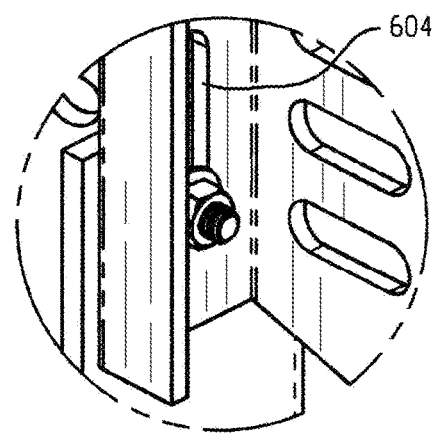
FIGS. 17C and 17D are enlarged views of respective portions of FIG. 17A.
Figure 17D:
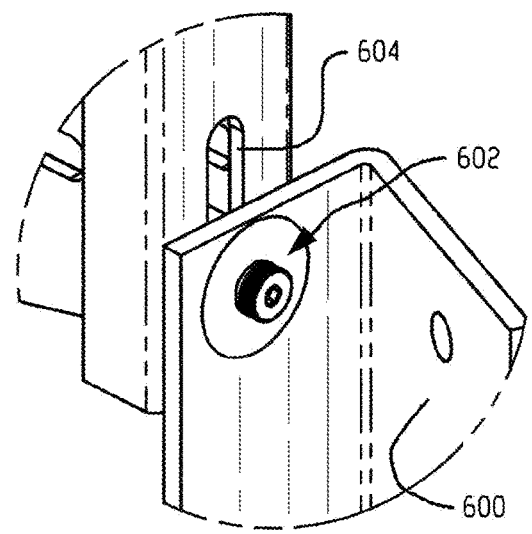
Figure 18:
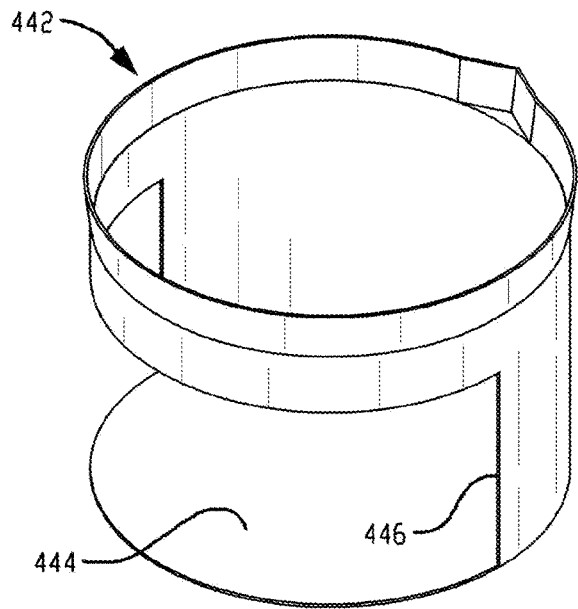
FIG. 18 is a perspective view of an upflow pipe used in the separator of FIG. 10A.

A grate 460 may be installed over the drop chute opening on the topside of the insert. The grate 460 serves the purpose of spreading the inflow as it enters the drop chute and attenuates stream velocities. The grate 460 may be mounted to the tank wall by a pivot arrangement best seen in FIGS. 17A-17D, which allows the grate to be moved to a raised position to enable substantially full access to the drop chute opening (e.g. during maintenance). The pivot arrangement includes spaced apart brackets 600 that may be mounted to the tank wall. Each bracket includes an associated pivot pin assembly 602 (e.g., a nut and bolt assembly) passing therethrough and engaging with a slot 604 on a side edge of the grate 460. The grate 460 can pivot relative to the brackets 600 from any up or chute open position (FIG. 17A) to a down or chute covering position (FIG. 17B). The free end 610 of the grate rests upon the insert 402 (e.g., immediately above the arcuate panel 426 of the drop cute) when the grate is moved to the horizontal, down position. Notably, the grate 460 need not cover the entire area of the drop chute opening. In the illustrated embodiment the grate covers the drop chute in the vicinity of the tank inlet 408 or directly adjacent the tank inlet.

A perforated baffle 470 may be installed in the treatment chamber 406 such that it intercepts the flow path and spreads the flow and attenuates stream velocities, thereby increasing the flow path and unit hydraulic efficiency, increasing sediment removal efficiency, and reducing the potential for resuspension of previously captured sediment. The perforated baffle may 470 be constructed of a rigid material, such as metal, or may be constructed of a lightweight flexible material, such as a polymeric mesh. The attachment of the perforated baffle may be rigid and immovable, or may be non-rigid and movable.

Figure 15A:
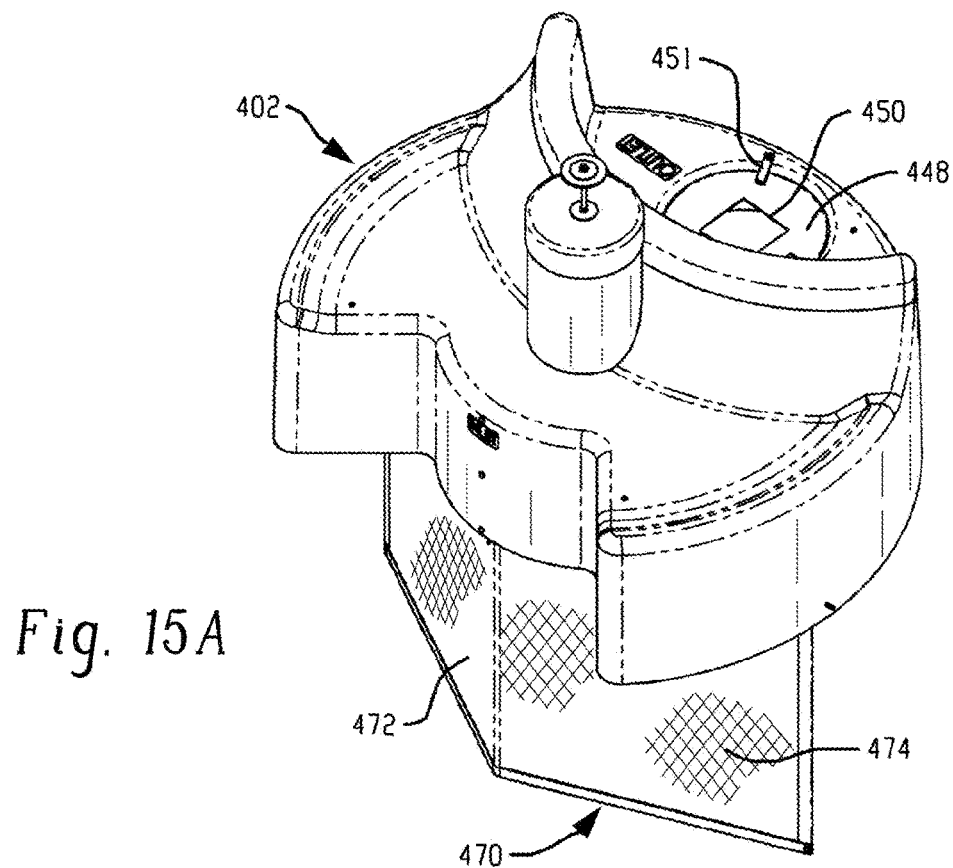
FIGS. 15A, 15B and 15C are perspective views of the combined insert and perforated shroud of the separator of FIG. 10A.
Figure 15B:
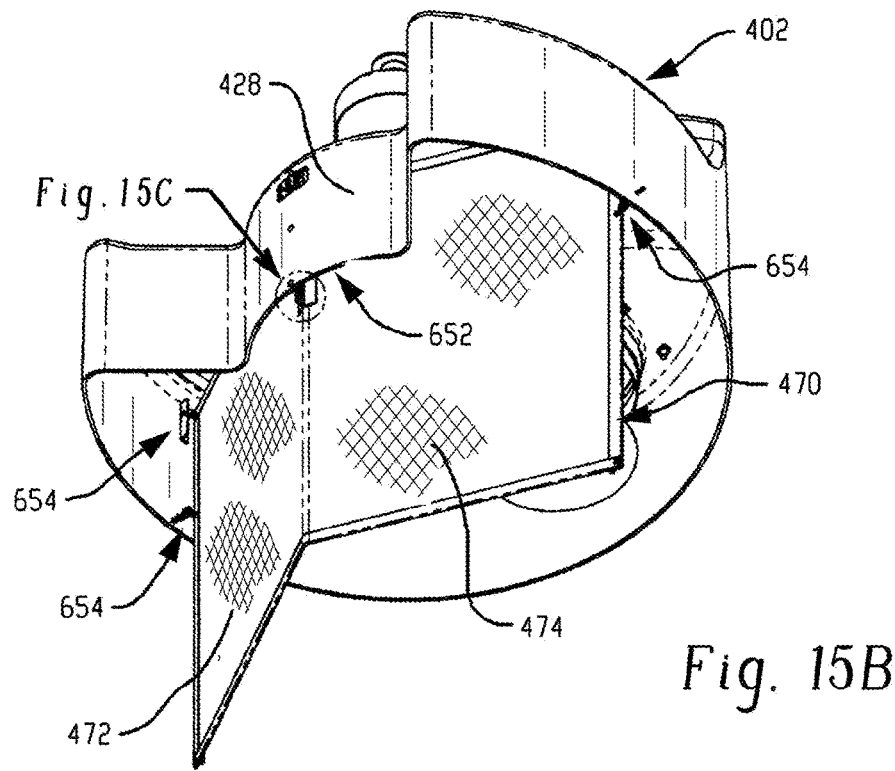
Figure 15C:
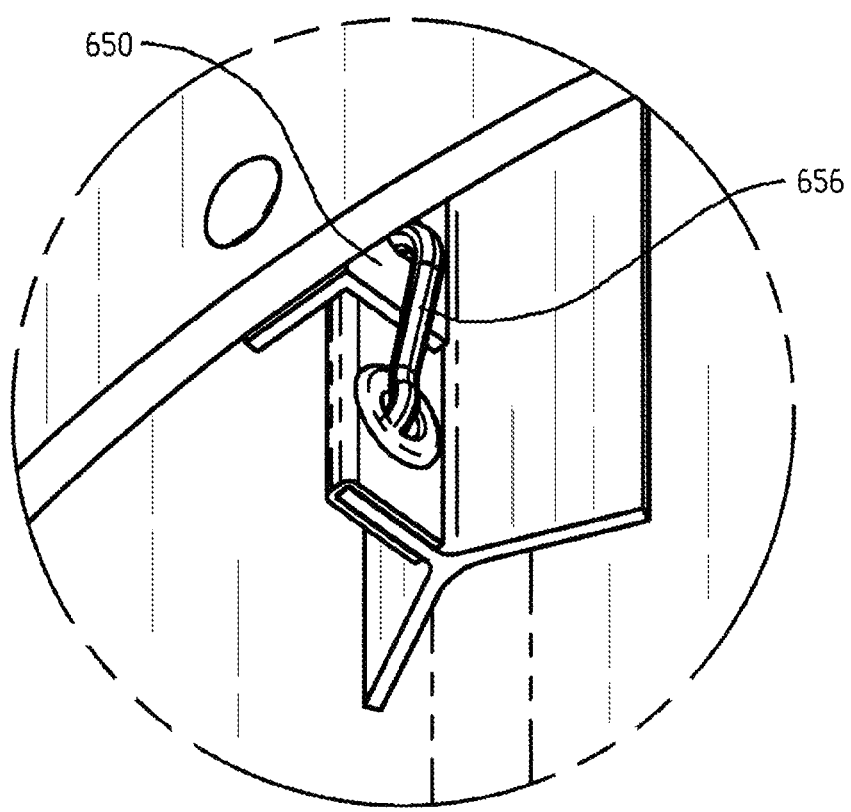
Figure 16:
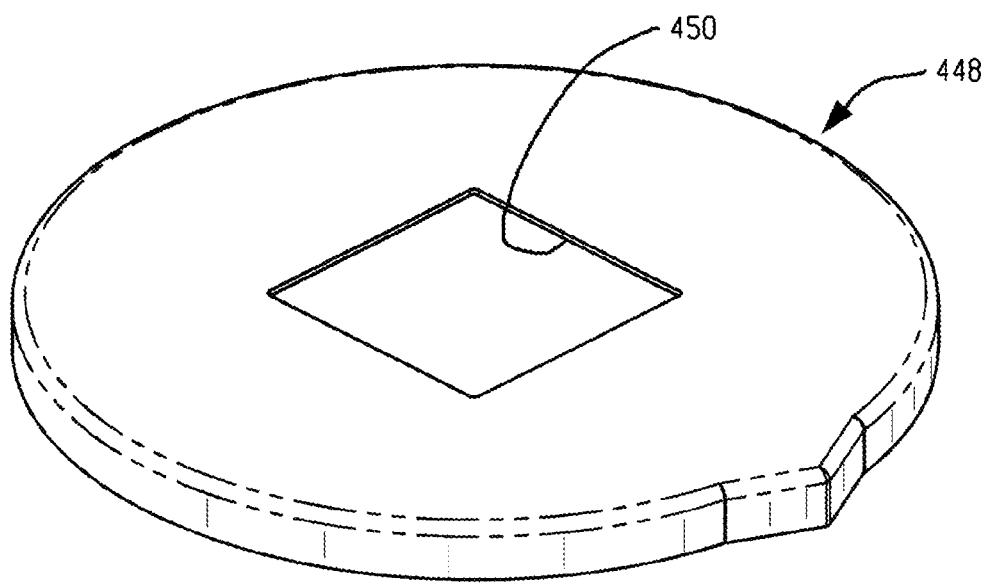
FIG. 16 is a perspective view of an orifice plate used in the separator of FIG. 10A.

In the case of attachment that is movable, components such as carabiners or plastic zip-ties may be used to attach the perforated baffle to attachment points on the walls of the vessel, on the drop chute, or both. For example, as seen in FIGS. 15B and 15C, mount brackets 650 may be connected to the insert at a central location 652 on the arcuate panel 428 and at side location 654, and carabiners 656 may interconnect the frame structure of the baffles 470 to the mount brackets. In the case of attachment that is movable, inflow may impart motion to the perforated baffle 470 (e.g., permitted by the loose carabiner connection arrangement) that facilitates a self-cleaning effect.

The shape of the perforated baffle may include an angle or angles that serve to increase the surface area of the perforated baffle and thereby better spread the flow and better attenuate stream velocities. In the illustrated embodiment the perforated baffle 470 is of a V-shape formed by two substantially planar baffles sections 472 and 474, where the point of the V-shape (or line of intersection between the two baffle sections) is positioned proximate to (e.g., within about 0 to 4 inches of) the arcuate panel 428 of the drop chute with the point located substantially in line with a mid-point of the arc of the panel 428, and with both baffle sections 472 and 474 extending away from the drop chute and toward the tank sidewall. Thus, the baffle 470 wraps toward the upflow pipe 442 and outlet opening 440.

The perforated baffle length, width, and opening dimensions can vary depending on the pollutant of concern. If, for instance, gross pollutant capture is a primary concern, the perforated baffle could be constructed with length, width, and opening dimensions that effectively screen all flow within the treatment chamber and prevent gross pollutants from exiting the treatment chamber through the upflow pipe. Additionally, a perforated baffle could also be added on top of the insert or weir of the insert to impart similar screening of gross pollutants from flows that begin to reach the top of the weir, or overflow the weir. The positioning of this screen can be in either a manner that is angled −45 to 45 degrees so pollutants are directed back toward the curved weir and to the drop chute, or directly to the drop chute, with the angle providing self-cleaning and gross pollutant capture during normal operation.

In one example, the perforated baffle is formed of a geotextile that creates the "curtain" configuration. The curtain geotextile may be Pyramat, Armormax or Landlok by Propex, with a 3-dimensional pyramidal pattern woven into the fabric or other 3 or 2-dimensional woven polypropylene fabrics. Exemplary parameters of the curtain material may be apparent opening size of about 425 micron or more (such as 2 mm or more, such as about 1.25 inches), percent open area of about 6% or higher (such as about 50% or higher, such as about 60%), water flow through rate of about 60 gpm/ft2 or higher (such as about 420 gpm/ft2). Grommets may be incorporated into the sides edges the geotextile and at the mid-point of the curtain (at the V angle point). Stiffening rods (e.g., center rod 670 and side rods 672 shown in FIGS. 14C and 14D) or stiffening springs or weights or any combination of them may also be sewn into either side of the curtain, and in the middle. Some level of stiffening and suitable buoyancy is desired so that under the highest flows the curtain does shake/move, but does not fold toward the outlet in a substantial way. The use of springs may allow the curtain to be intentionally bent during the curtain installation process with suitable positional memory.

The curtain baffle 470 may be attached to the insert at the arc panel of the drop chute, and side walls using the carabineers as described above. There may be a gap between the vertical edges of the curtain and the tank sidewalls of roughly about 1-inch, and there may be a gap as well between the top of the curtain and the underside of the insert. The gap at the top can be sealed in some cases if desired.

By way of example, the operation of the device may be as follows. A single inlet pipe or multiple inlet pipes deliver influent to the top of the insert on the upstream side of the weir. A pond of variable depth depending on influent flow rate is formed on the upstream topside of the insert. Influent is conveyed into the drop chute 420, with the central portion of flow first flowing through the openings in the grate 460 that extends across the central portion of the drop chute opening directly in line with the primary inlet pipe. The grate 460 spreads the central portion of flow and attenuates stream velocities entering the drop chute. Influent is conveyed downward through the drop chute 420 and into the lower treatment chamber 406, where gravity separation of sediment and floatables occurs. The bottom of the drop chute is at an elevation equal to, or lower than, the top of the slot opening 446 in the backside of the upflow pipe 442 on the opposite side of the treatment chamber. The flow path through the drop chute 420 is downward, while the flow path to the slot opening 446 in the upflow pipe is across the chamber (back toward the drop chute) and upward. The combination of the distance between the bottom of the drop chute and the upflow pipe opening, the downward direction of flow entering the treatment chamber, and the required changes in direction of flow to reach the upflow pipe opening 446, imparts a long flow path that improves hydraulic efficiency and the separation of sediment from the influent prior to the entry of treated water into the upflow pipe slot opening 446.

Sediment is preferentially deposited in the sump (floor) at or near the inlet side of the treatment chamber, under the drop chute. The large crossectional surface area of the drop chute 420 creates a pond with relatively slow downward movement such that the average velocity of influent discharging from the bottom of the drop chute is insufficient to significantly resuspend accumulated sediment in the sump. Additionally, influent exiting the inlet pipe immediately contacts the pond formed over the drop chute, which serves to attenuate the water velocity as it moves toward the upstream side of the weir, and thereby reduces the potential for "hydraulic jump" over the weir.

The perforated baffle 470 may be installed in the treatment chamber such that it intercepts the flow path from the bottom of the drop chute 420 to the upflow pipe opening 446. The perforated baffle 470 spreads the flow and attenuates stream velocities, thereby increasing the flow path, increasing sediment removal efficiency, and reducing the potential for resuspension of previously captured sediment. In the case of a perforated baffle with large surface area and relatively small perforations, sediment particle coalescence may be enhanced and some of the sediment deposited on the perforated baffle. In the case of installation of a perforated baffle constructed of a lightweight flexible material using a non-rigid and movable attachment method, water currents in the treatment chamber during inflow may impart motion to the perforated baffle that facilitates a self-cleaning effect.

Floatables, debris or hydrocarbons that are conveyed through the drop chute 420 and into the treatment chamber 406 rise up or sink and are captured under the insert 402, with the minimum oil storage capacity defined by the distance of the top of the slot opening in the upflow pipe from the underside of the insert.

The flow rate into the lower treatment chamber 406 is a function of the water elevation on the inlet side 414 of the weir 412 and the open area of the flow control orifice 450 attached to the insert over the top of the upflow pipe 442. Treated water enters the upflow pipe 442 and discharges through the flow control orifice 450, onto the outlet side 416 of the insert, and exits through the outlet opening 410 to the outlet pipe 492.

During storm events with very high influent flow rates, the water elevation on the upstream side of the weir 412 may exceed the height of the weir, and the excess flow passes over the top of the weir to the downstream side 416 of the insert, and exits through the outlet opening 410. This is an "internal bypass" feature.

When inspection or maintenance cleaning is performed, the removable cap 419 of the centrally located maintenance cleanout port 418 is removed by means of lifting the attached handle 421. A measuring stick or vacuum hose is inserted through the open port to measure or remove sediment and oil from the lower treatment chamber. Alternatively, or as a supplemental maintenance cleaning procedure, the vacuum hose may be inserted through the drop chute opening to access accumulated sediment on the inlet side of the sump. Having multiple openings for maintenance access provides capability for more thorough cleaning of the device.

Referring now to FIGS. 19A-19C, another insert variation is shown, where the insert 502 includes opposing downwardly extending insert panels 530, 532 that adjoin an arc panel 528. These panels, in combination with the tank wall, will form the drop chute. Notably, the vertical extent or depth of the panels 528, 530 and 532 is smaller (e.g. on the order of about 6 inches) than in the case of the chute defining panels of the aforementioned insert 402. This configuration is particularly useful in the case of smaller tanks in order to limit downward velocities directed toward the sump area and thereby limit flows that might stir-up of previously captured sediments, causing scour. Other separator configurations are also possible.

In this regard, reference is made to FIG. 20, where a cross-sectional elevation view of one embodiment of a separator unit 10 is shown. The separator unit includes a tank 12 (e.g., of concrete, fiberglass or any other suitable material), in this case defined by bottom wall 14, sidewall 16 and top wall 18. The tank defines an internal volume 20. An inlet pipe 22 is connected to a sidewall inlet opening 24 to deliver liquid into the tank and an outlet pipe 26 is connected to a sidewall outlet opening 28 to deliver liquid out of the tank. A deck insert 30 is located within the tank and separates the tank into an upper chamber 32 and a lower chamber 34. The insert includes a weir 36 at its upper side 38 to define an intake area 40 for receiving an influent liquid that enters via sidewall opening 24. An opening 42 is provided through the insert in the intake area 40 for delivering liquid down into the lower chamber 34. A T-shaped drop tube 44 extends downward from the opening 42 and into the lower chamber 34. A lower end of the T-shaped drop tube is elevated above the bottom of the tank and includes lateral passages 46 that deliver liquid into the lower chamber. As used herein T-shaped refers generally to any drop pipe having a T-shape or any other drop pipe in which the flow produced by the drop pipe is generally T-shaped (i.e., flow downward and then laterally out the sides).

As shown, an opening 48 through the insert is located on an opposite side of the weir 36 for delivering liquid from the lower chamber 34 back up into the upper chamber 32 so that the liquid can exit the tank through outlet 28. In the illustrated example a riser pipe 50 extends downward from the opening 48 and defines a flow passage to the opening 48.

A perforated shroud 60 is located such that liquid exiting the lateral passages 46 is directed to flow into the perforated shroud (either immediately in the case shown or at some point before passing out of the lower chamber) to distribute the liquid flow across the surface of the perforated shroud 60. The shroud 60 extends downward from the deck insert 30 to a location below the lower end of the drop tube passages 46, but above the bottom of the tank. Water exiting laterally from the drop tube impacts the perforated shroud 60 and therefore the flow is distributed across the surface of the perforated shroud 60 as it passes therethrough, and energy is dissipated. This distribution helps prevent the establishment of a streamlike flow and energy that creates the undesired dead areas, short-circuiting, and jet-like velocities that can cause previously captured pollutants to washout of the system if not managed. Use of a perforated shroud 60 around the flow entry passages 46 of the lower chamber 34 generates flow and velocity spread to improve the system's overall hydraulic efficiency in the lower chamber 34, allowing for increased pollutant removal, and reduced short circuiting to the outlet 48, reducing flow and pollutant channeling downward to the sump or direct to the outlet 48. Gross pollutants that are larger in shape or diameter than the perforation openings will be trapped below the insert, and pushed down by inward velocities, moving these materials towards the other side of the shroud where they will remain trapped in the lower chamber 34.

Figure 21:
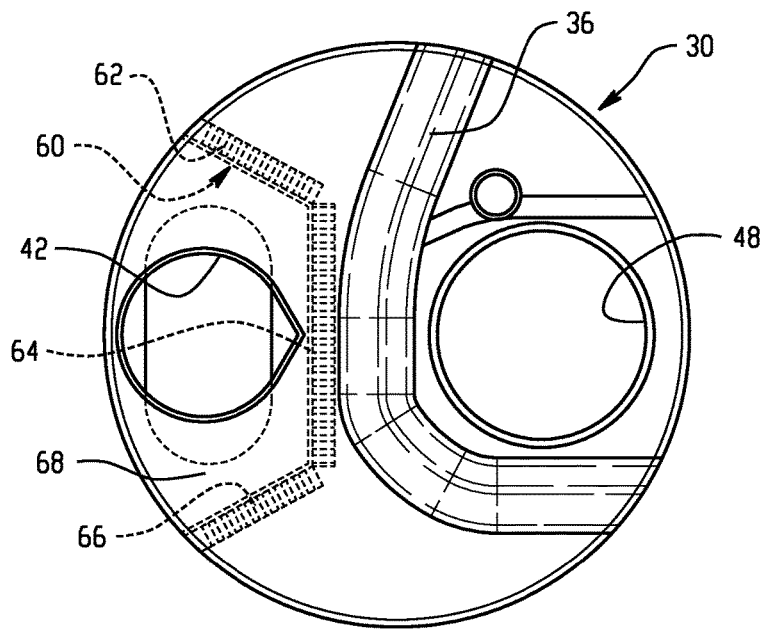
FIGS. 21, 22 and 23 are views of a combined insert and perforated shroud used in the separator of FIG. 20.
Figure 22:
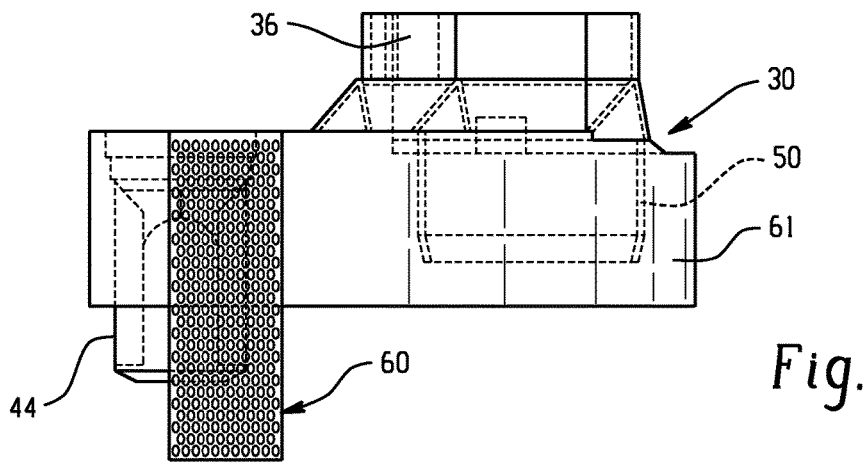
Figure 23:
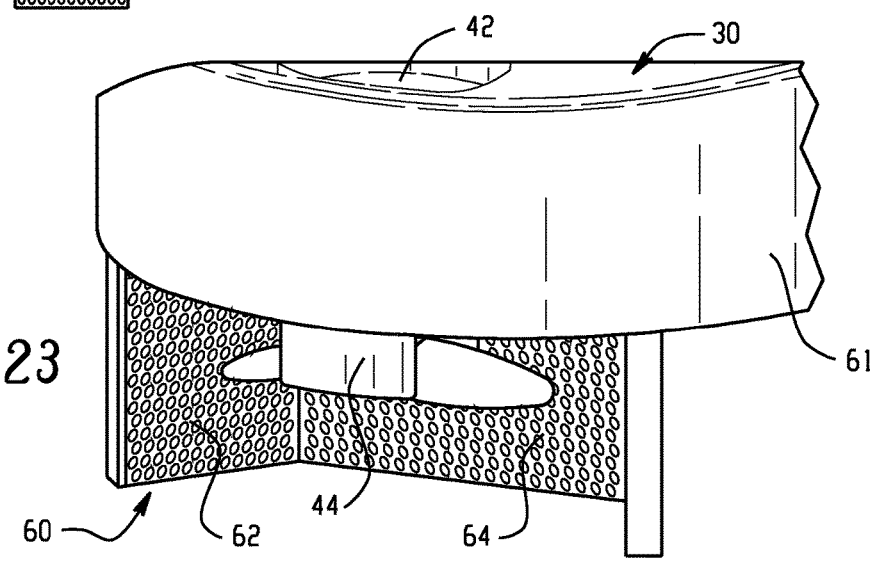

In the illustrated embodiment of FIGS. 21-23, the perforated shroud is made up of three generally planar segments 62, 64 and 66 that extend vertically downward from the underside of the insert 30 and which are angularly oriented relative each other to create an intake space 68 about the drop tube 44. The panel segments are all generally uniformly perforated, with the perforations distributed across substantially the entire surface of each panel segment. However, variations are possible. For example, the perforation openings, spacing, size, orientations and open area can vary for an increase or decrease in head loss and energy dissipation and can be selected to manage the desired flow path, head loss, and energy dissipation in the lower chamber 34, while allowing stormwater and associated pollutants to enter, and be trapped in the lower chamber 34. The perforated shroud 60 can be partially or fully perforated, with at least one opening with various dimensions, various open space, various perforation shape or shapes, and orientation to the incoming flow. Perforations could be of various constructions ranging from openings less than ¼-inch diameter to as large as or larger than 4-inch diameter openings, with 15% open area to 85% open area, various thicknesses and depths, or various shapes.

The shroud wall can be produced from flat, straight wall material, or from a corrugated material of various pitches and depth, or grating that is straight or expanded in the Z-direction for an increase or decrease in head loss and energy dissipation, and surface area. The perforated shroud could also be of curved wall configuration. Sediment, oils and hydrocarbons can flow through the perforation openings.

The distance from the top of the perforated shroud 60 to the underside of the insert 30 could vary. In the illustrated example, the top of the perforated shroud abuts the underside of the insert, but the top edge could be spaced up to several feet below the insert (depending upon the length of the drop pipe 34). The lower edge of the shroud should be spaced below the bottom of the drop tube 34, but above the bottom of the lower chamber. Placement of the perforated shroud about the riser pipe 50 is also an option. Generally the perforated shroud should be orientated to intercept flow entering the lower chamber 34 in a manner that at least some of the flow will need to pass through the shroud to reach the outlet opening 48. Shroud walls can be curved or angled inward, or angled outward around the drop intake space 68, or about the riser pipe 50. A circular shroud that completely or partially surrounds the drop tube 44 or riser pipe 50 may also be used.

Figure 24:
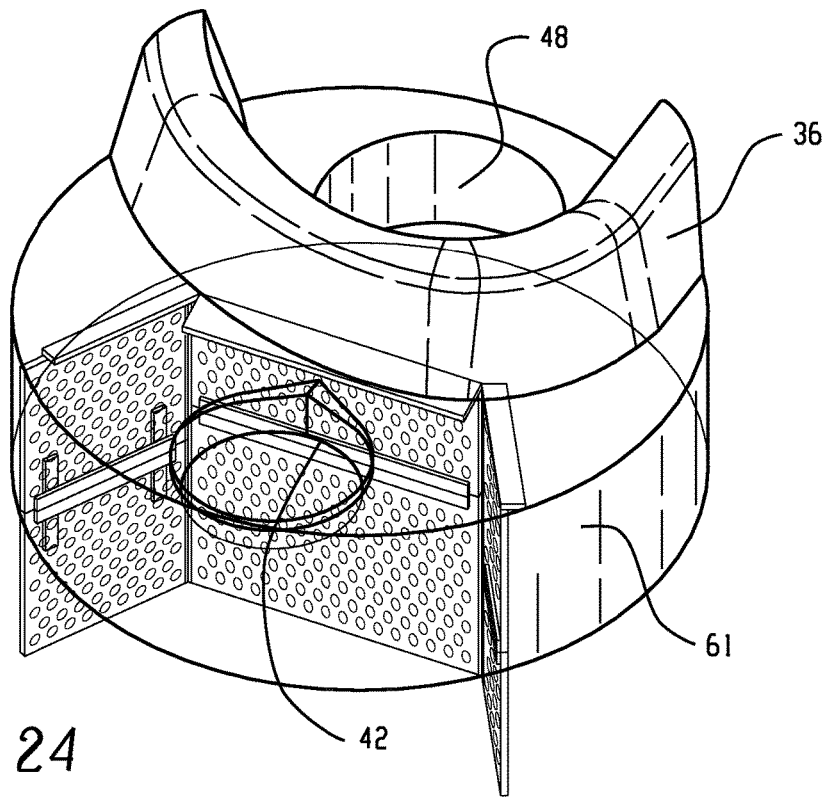
FIGS. 24 and 25 are views of another embodiment of a combined insert and perforated shroud.
Figure 25:
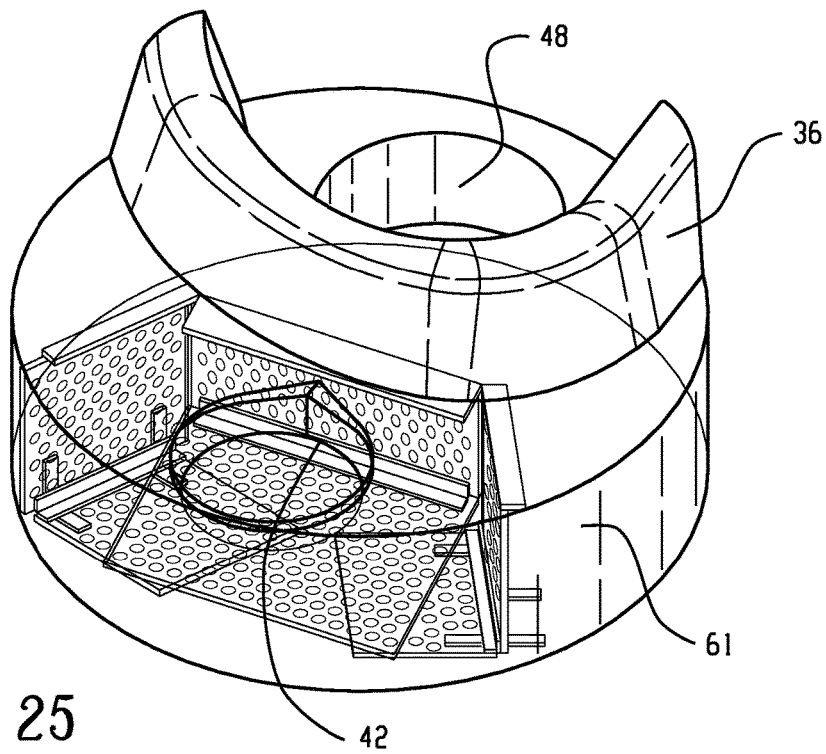

The bottom of the perforated shroud can be left open, but closed configurations using a perforated bottom wall or a solid bottom wall are also possible. The shroud walls could be water tight sealed to the underside of the insert and/or the tank sidewall, or have some open space between underside of the insert and/or the tank sidewall. The perforated shroud can be made of a single piece, or multiple pieces. In the case of combining multiple pieces they may be connected together by hinge(s) as needed (e.g., per FIGS. 24 and 25), in such a manner that the overall shroud can fold-up underneath the insert 30 (e.g., within a pocket at the bottom of the insert, which pocket is formed radially inward of the downwardly extending annular sidewall 61 of the insert) to allow for ease of shipping and installation. At the time the insert is installed at the job site, the shroud can easily unfold into its desired operating position underneath the insert as desired.

The riser pipe 50 may be partially perforated as well, as suggested by perforations 75 in FIG. 20, particularly on the side of the riser pipe that faces away from the location of the drop tube 44. In such cases the bottom of the drop tube may be closed. Also, the shroud may be formed of corrugated material.

In one example, a distance d1 from the top edge of the weir 36 to the invert of the inlet opening 24 is between eight inches and sixteen inches or, in another example, at least twelve inches. A distance d2 from the invert of the inlet opening 24 to the bottom of the T-shaped drop tube 44 is between about twenty inches and forty-eight inches (e.g., between about 24 and 36 inches). In such a case, where a thickness of the insert 30 is between about 1 inch and four inches, the depth of the T-shaped drop tube into the lower chamber 34 would be between about seventeen inches and about fort-seven inches. A distance d3 from the invert of the inlet opening 24 to the bottom of the perforated shroud 60 is greater than distance d2, and between about twenty-five inches and about sixty inches. However, other variations are possible depending upon factors such as the depth and diameter of the lower chamber 34.

The use of the perforated shroud 60 enhances separation performance, particularly at higher flows. However, other performance enhancing features may also be used, either in combination with the perforated shroud or independently.

Figure 26:
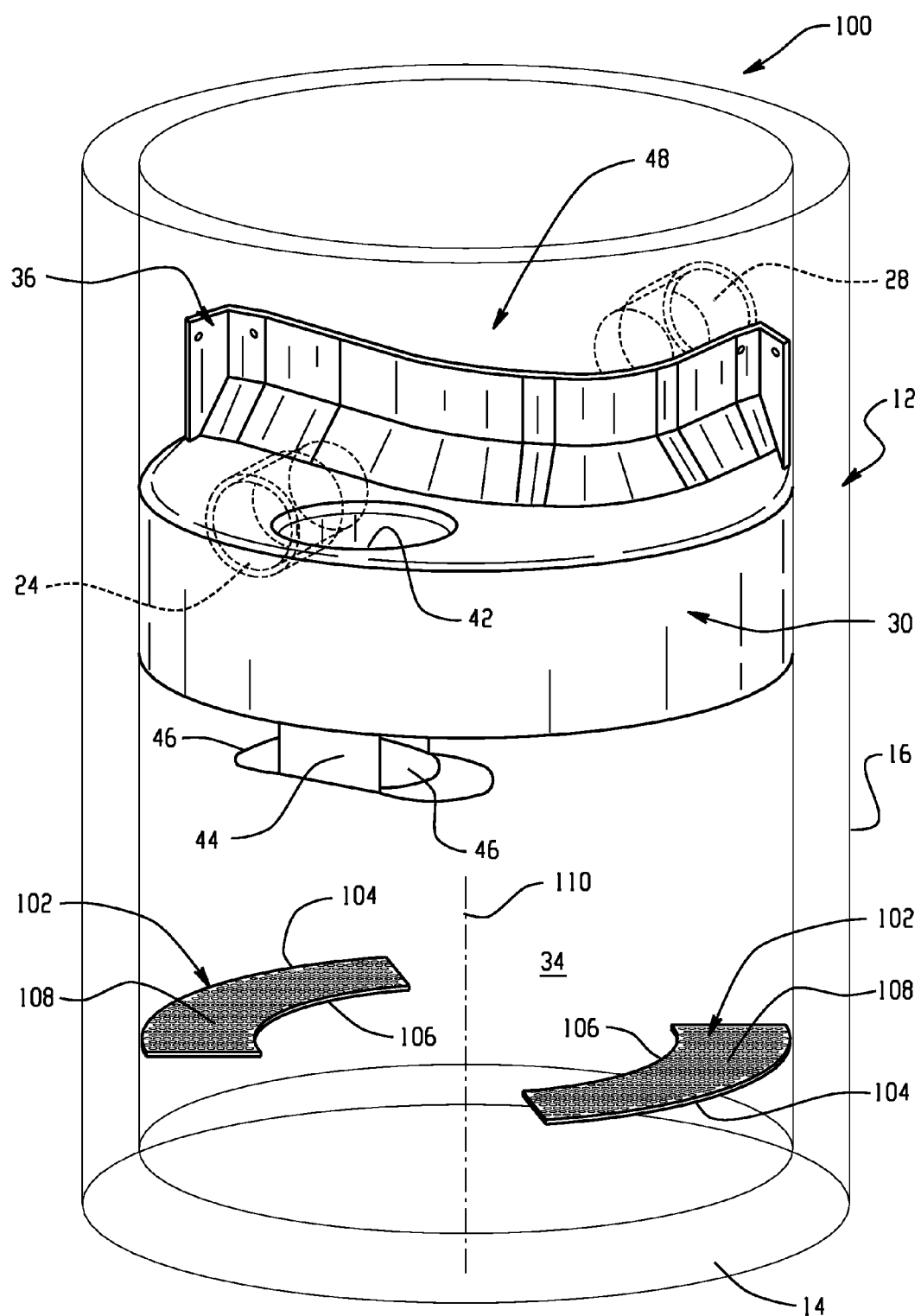
FIG. 26 is a perspective view of another embodiment of a separator.
Figure 31A:
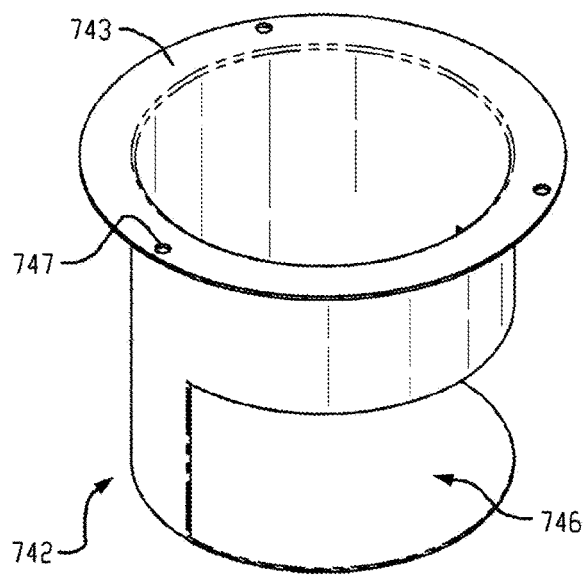
FIGS. 31A and 31B show perspective views of the upflow pipe of the deck insert assembly of FIG. 27A.
Figure 31B:
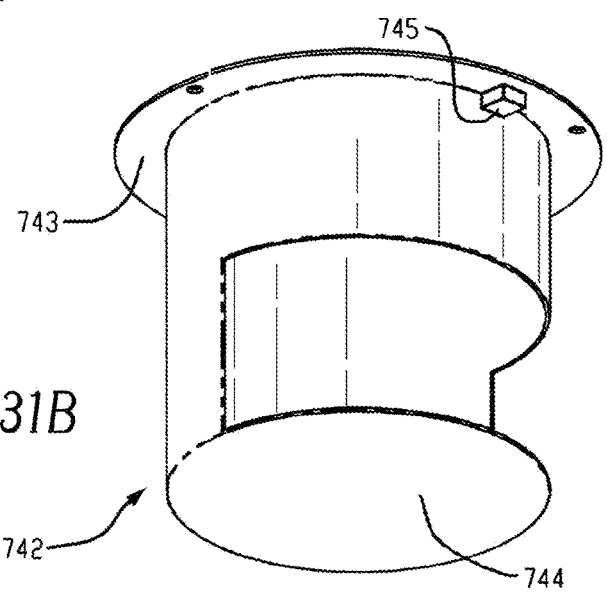
Figure 32:
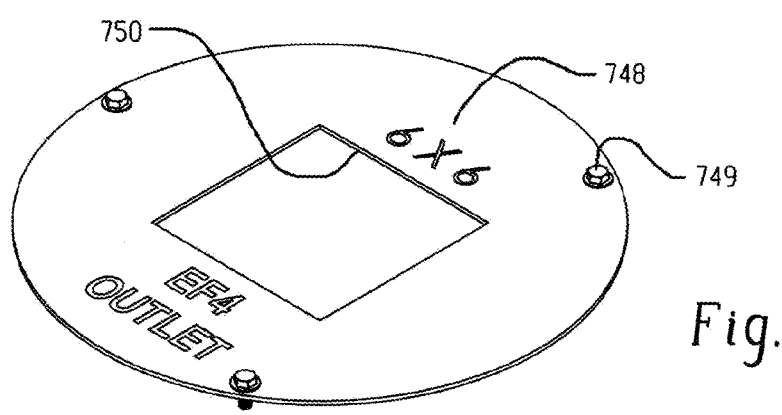
FIG. 32 shows a perspective view of the orifice plate of the deck insert assembly of FIG. 27A.

Referring now to FIG. 26, an alternative separator unit configuration 100 is shown. Like separator unit 10, separator unit 100 includes a tank 12 with bottom wall 14, sidewall 16 and top wall (not shown), as well as the insert 30 with associated openings 42 and 48 on opposite sides of weir 36 and T-shaped drop tube 44 with outflow passages 46. The separator unit 100 also includes one or more perforated baffle plates 102 located in the lower chamber 34, at a height below a lower end of the T-shaped drop tube 44 and above a bottom 14 of the tank. The illustrated perforated baffle plate(s) 102 extend around a partial circumference of the lower chamber 34, each plate having an outer edge 104, an inner edge 106 and a body portion 108 extending from the outer edge to the inner edge. As shown, the outer edge 104 is a radially outer edge that is located toward the sidewall 16 of the tank and the inner edge 106 is spaced from both the sidewall 16 of the tank and a central upright axis 110 of the lower chamber.

The baffles 102 are designed to intercept and then redistribute and weaken any flows and associated velocities moving downward toward the bottom/sump of the lower chamber. By doing so, channeled flows and velocities are dissipated and distributed, mitigating the potential for re-suspension of previously captured sediment commonly found at the bottom or sump of the chamber as a result of gravity. The orientation of the perforated baffles 102 can vary, as can the perforation openings, spacing, size, orientations and open area. In one example, where a diameter of the lower chamber is between four feet and twelve feet, a horizontal dimension of the perforated baffle plate (in axial projection) is between six inches and sixty-six inches (e.g., between twelve inches and 48 inches). In one example, where a vertical height of the lower chamber is between four feet and twenty-four feet (e.g., between four feet and sixteen feet), a vertical height of the perforated baffle plate above a bottom of the tank is between six inches and seventy-two inches (e.g., between twelve inches and thirty-six inches).

Figure 10B:
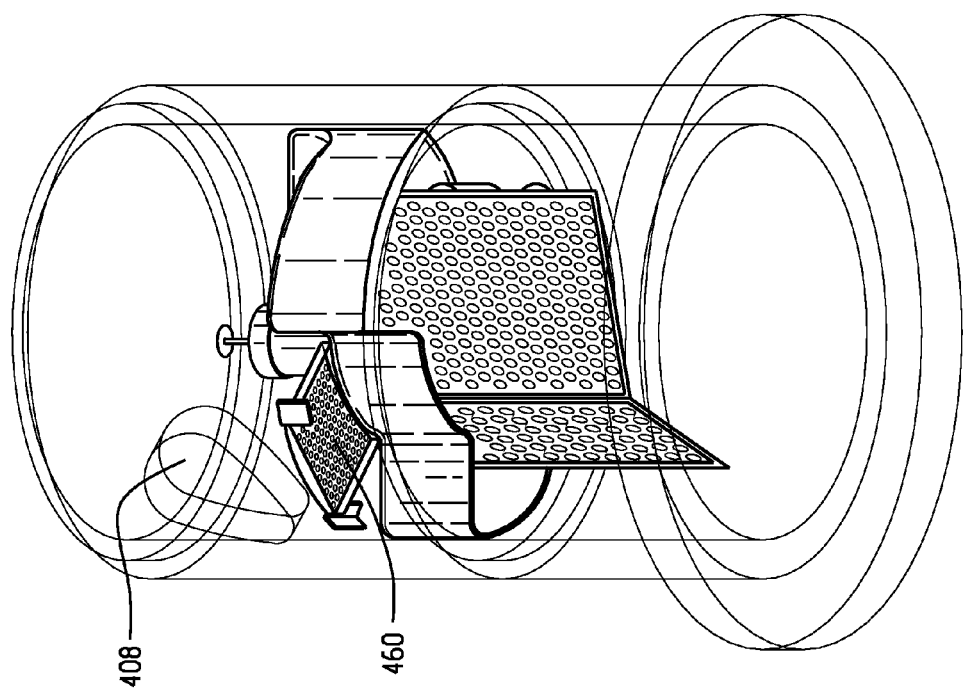
FIGS. 10A and 10B are perspective views of another embodiment of a separator unit.
Figure 10A:
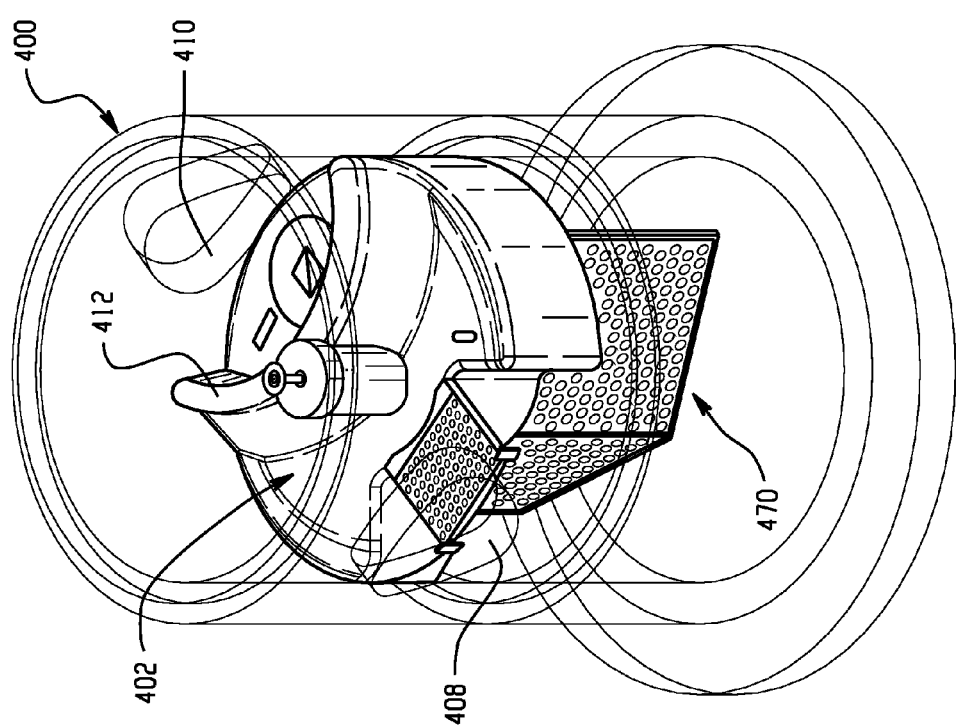
Figure 10D:
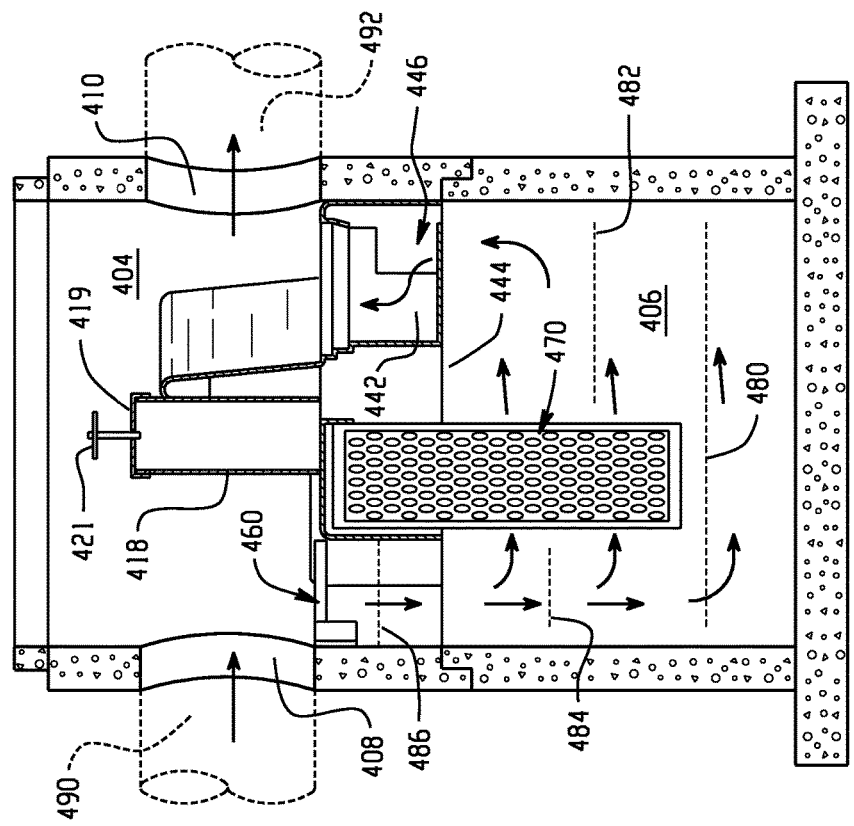
FIG. 10D is a cross-section of the separator of FIG. 10A.
Figure 10C:
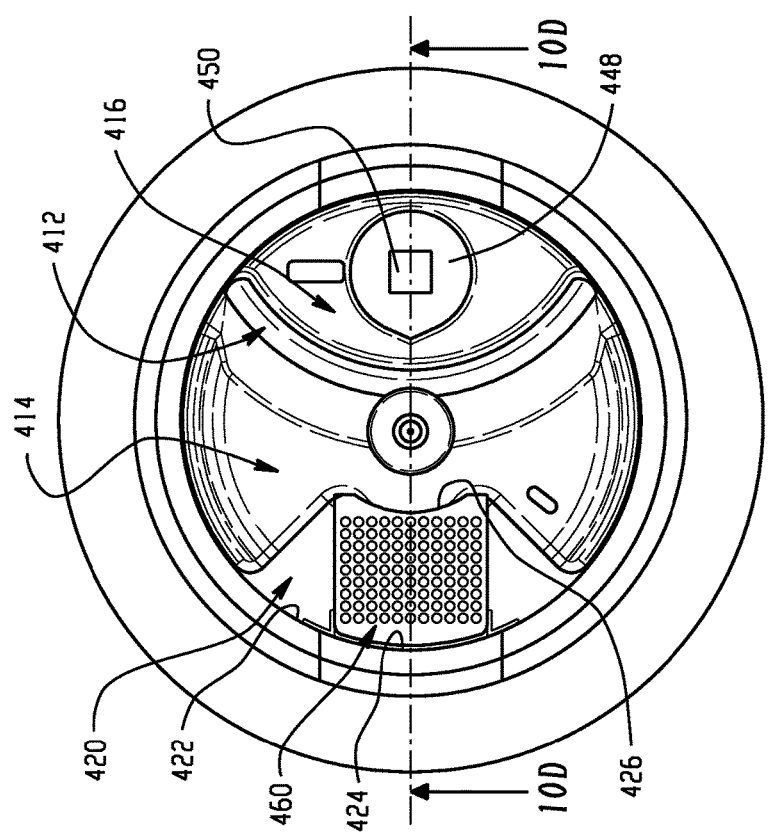
FIG. 10C is a top view of the separator of FIG. 10A.
Figure 11A:
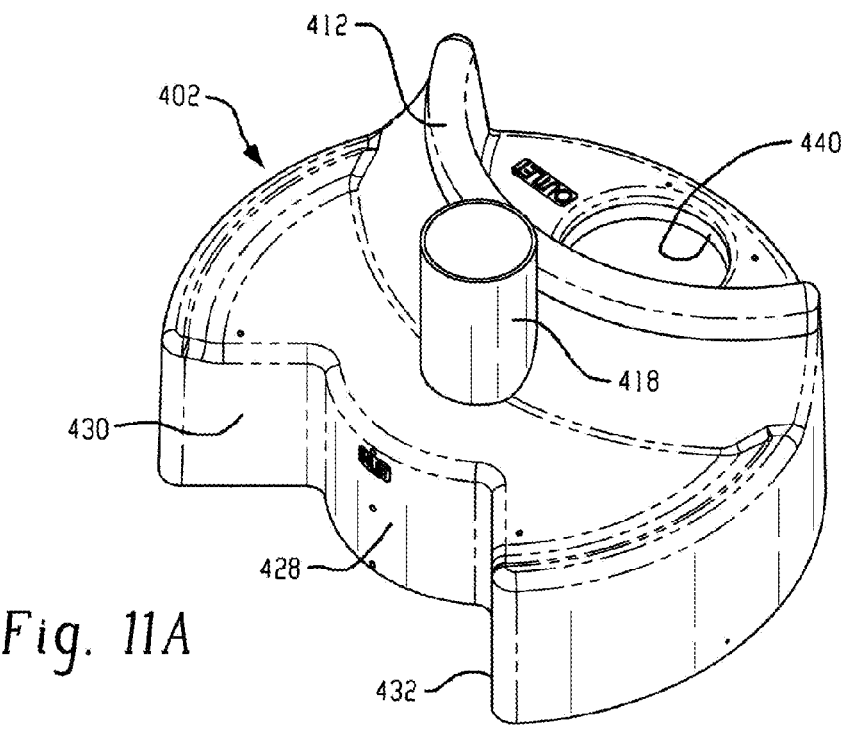
FIGS. 11A, 11B and 11C are perspective, top and cross-section views respectively of an insert used in the separator of FIG. 10A.
Figure 11B:
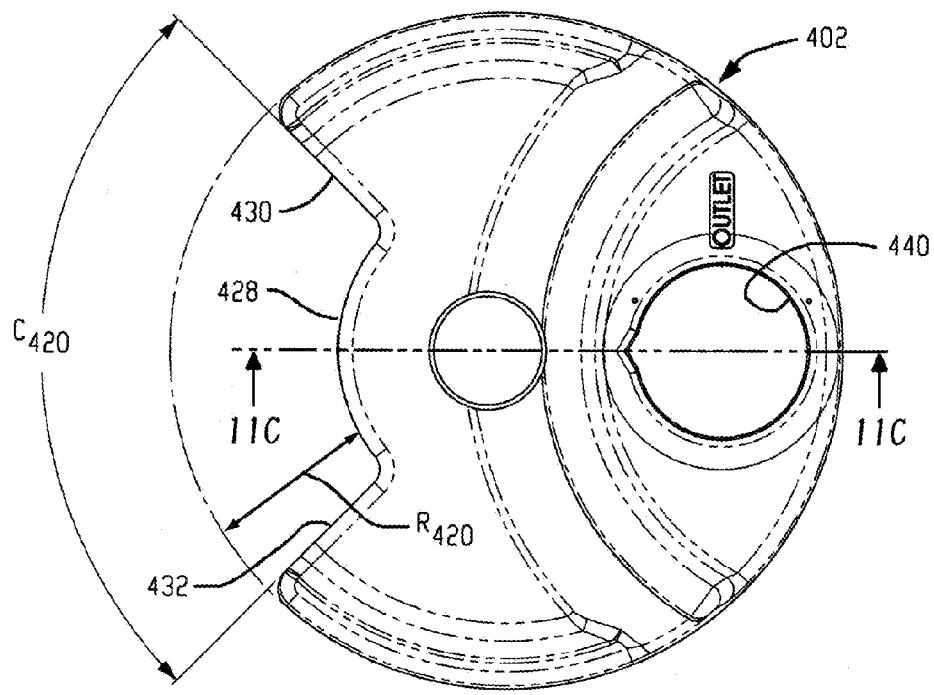
Figure 11C:
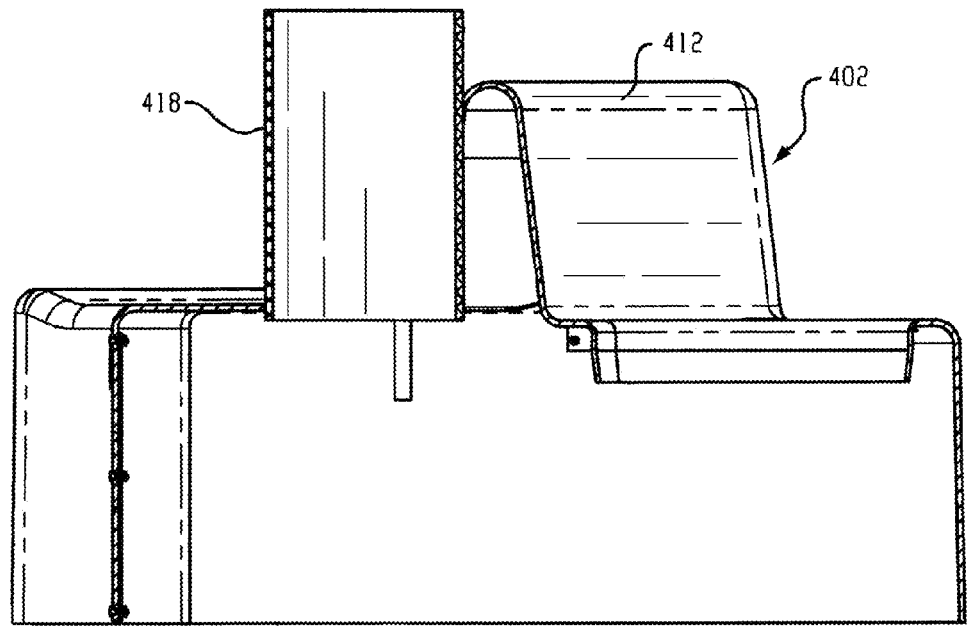

It is recognized that the perforated baffles 102 could also be incorporated into the separator of FIG. 1 or the separator of FIG. 10A, or a separator including the insert assembly as described below with respect to FIGS. 27-31. In either embodiment, perforated baffles could be positioned substantially horizontally in one or more of the lower chamber (e.g. as represented by any of dashed lines 480, 482 and/or 484 in FIG. 10D or dashed line 380 in FIG. 3), atop the drop chute (e.g., in place of the grate 460 in the embodiment of FIG. 10D or as represented by dashed line 384 in FIG. 3) and/or within a vertical extent of the drop chute (e.g., as represented by dashed line 486 in FIG. 10D or as represented by dashed line 382 in FIG. 3).

Referring now to FIGS. 27A-27C an alternative deck insert assembly is shown, which deck insert assembly may be incorporated into the tank 400 shown in FIGS. 10A-10D, with or without the grate member 460 and with or without the horizontal baffles 480, 482, 484 and 486. As seen in FIGS. 27A-27C, the deck insert 702 includes a weir 712 that is intersected by cleanout pipe 718. Notably, the surface 713 of the deck insert slopes toward the drop chute area, and arcuate panel 728 and planar panels 730 and 732 are provided to define (in combination with an arcuate portion of the tank wall) the inlet drop chute. A perforated baffle 770 (e.g., similar to baffle 470) may be installed at the underside of the insert so as to extend into the lower treatment chamber when the deck insert assembly is installed in a tank. In the illustrated case components such as carabiners or plastic zip-ties may be used to attach the perforated baffle to attachment points on the downwardly extending sidewall of the insert (e.g. at points 754 and/or at central location 758 where mount bracket 750 and carabiner 756 are shown engaging a bracket portion of the perforated baffle structure 770). The upflow pipe 742 and orifice plate 748 are also shown.

Notably, the maintenance pipe 718 accommodates an extension component 725 for installations in which the maintenance pipe 718 needs to be higher due to anticipated water levels (e.g., potential submerged conditions) within the separator. As seen in FIGS. 28-30, the extension 725 is a separate tubular member including an upper portion 727 and lower portion 729, with an external rib or flange 731 therebetween. The lower portion 729 fits into the upper end of the maintenance pipe 718 with the bottom of the flange 731 seating on the upper edge of the maintenance pipe. The extension 725 may be sealingly attached once installed (e.g., glued or glassed in the case of fiberglass components). The extension can be easily installed in the field to ease shipping. The maintenance pipe 718 has a taper such that upper inner and outer diameters (e.g., inner diameter $D_U$) of the pipe are slightly smaller than the lower inner and outer diameters (e.g., inner diameter $D_L$). This configuration allows for nesting of multiple deck inserts one atop the other, which can save on transportation costs. The maintenance pipe 718 may be glassed in for connection with the rest of the insert for added strength.

As seen in FIG. 28, the opening 740 in the insert that receives the upflow pipe includes a key notch 741 to assure proper circumferential positioning of the upflow pipe. Per FIGS. 31A and 31B, the upflow pipe 742 includes an upper flange 743 that rests atop the insert and a key block 745 that fits into the key notch 741. The flange 743 includes multiple openings 747 positioned to align with bolt style fasteners 749 on the orifice plate 748, where the bolts 749 engage with female threaded members that may be at the underside of the insert or that may be embedded in the insert. Thus, the orifice plate (which is larger than the opening 740) locks the upflow pipe 742 in place on the insert 702 against the upward exit flows. The bottom of the upflow pipe 742 is closed by plate 744 and the sidewall includes an inlet slot 746 that faces in a manner similar to that described above for slot 446.

It is to be clearly understood that the above description is intended by way of illustration and example only, is not intended to be taken by way of limitation, and that other changes and modifications are possible. For example, in some implementations a deck insert may be formed as an integral or unitary part of a separator tank (e.g., where a tank is of molded plastic configuration).

What is claimed is:

1. A separator unit, comprising:
    a tank defining an internal volume and having an inlet and an outlet;
    an insert within the tank and separating the tank into an upper chamber and a lower chamber, the insert including a weir at an upper side of the insert to define an intake area for receiving an influent liquid, a first opening through the insert in the intake area for delivering liquid down into the lower chamber and a second opening through the insert on an opposite side of the weir for delivering liquid from the lower chamber back up into the upper chamber;
    wherein the first opening is of arcuate shape;
    an upflow pipe extending downward from the second opening into the lower chamber, a bottom of the upflow pipe covered, and a slot opening in a sidewall of the upflow pipe.

2. The separator of claim 1 wherein first opening has an outer arc formed by a portion of a wall of the tank and an inner arc formed by a downwardly extending arcuate panel of the insert.

3. The separator of claim 2 wherein a circumferential extent of the outer arc and a circumferential extent of the inner arc are substantially the same.

4. The separator of claim 3 wherein each circumferential extent is between about 30° to about 150°.

5. The separator of claim 3 wherein each circumferential extent is between about 80° to about 100°.

6. The separator of claim 1 wherein the first opening includes an outer arc, an inner arc formed by a downwardly extending arcuate panel of the insert, and substantially planar sides formed by first and second opposed and downwardly extending substantially planar panels of the insert that adjoin the arcuate panel.

7. The separator of claim 6 wherein a radial width of the first opening is between about 25% and 50% of an inside radius of the tank.

8. The separator of claim 1 wherein the tank inlet is a sidewall inlet, the first opening is located below the sidewall inlet, a central portion of the arcuate shape of the first opening is positioned below the sidewall inlet, a first end portion of the arcuate shape is positioned to a first side of the sidewall inlet, and a second end portion of the arcuate shape is positioned to a second side of the sidewall inlet.

9. The separator of claim 1 wherein a grate member overlies at least part of the first opening.

10. The separator of claim 9 wherein the grate member is mounted for pivotal movement between a lowered position that overlies the first opening and a raised position.

11. The separator of claim 9 wherein the tank inlet is a sidewall inlet, the first opening is located below the sidewall inlet, and the grate member overlies the first opening in a region below the sidewall inlet.

12. The separator of claim 1, further comprising a perforated member extending downwardly from the insert into the lower chamber, the perforated member having a lower end that is higher than a bottom of the tank.

13. The separator of claim 12 wherein the perforated member is a rigid, non-movable member.

14. The separator of claim 12 wherein the perforated member comprises a flexible material and is mounted to permit some movement under flow conditions through the lower chamber.

15. The separator of claim 14 wherein the flexible material has stiffening rods, stiffening springs or weights, or any combination of stiffening rods, stiffening springs or weights, sewn into vertical edges of the flexible material.

16. The separator of claim 14 wherein the flexible material comprises a 3-dimensional geotextile material.

17. The separator of claim 12 wherein perforated member is of substantially a V-shape in top plan view, with a point of the V-shape located proximate the first opening.

18. The separator of claim 1 wherein the second opening includes an orifice plate with a rectangular flow control opening.

19. The separator of claim 1 wherein the slot opening spans no more than one half of a circumference of the upflow pipe, where a circumferential midpoint of the slot opening faces the tank wall at a point 180° from a midpoint of the arc-shaped first opening.

20. The separator of claim 1, further comprising:
    wherein the first opening includes an outer arc, an inner arc formed by a downwardly extending arcuate panel of the insert, and substantially planar sides formed by first and second opposed and downwardly extending substantially planar panels of the insert that adjoin the arcuate panel;
    a perforated member extending downwardly from the insert into the lower chamber, the perforated member having a lower end that is higher than a bottom of the tank, the perforated member including a central portion positioned toward the first opening and end portions positioned away from the first opening; and
    the slot opening facing away from a location of the first opening such that liquid traveling from the first opening to the second opening enters the upflow pipe in a direction that is in part laterally back toward the first opening;

wherein the perforated member is located between the first opening and the second opening such that some liquid entering the lower chamber so as to intercept flow from the first opening to the second opening thereby spreading the flow and attenuating stream velocities.

21. The separator of claim 1, wherein the arcuate shape of the first opening defines a segment of an annulus.

22. The separator of claim 1, further comprising:
the upflow pipe having an upper flange resting atop the insert;
an orifice plate with a flow control opening overlies the second opening and at least part of the flange of the upflow pipe to lock the upflow pipe in place against upward flows.

23. A separator unit, comprising:
a tank defining an internal volume and having an inlet and an outlet;
an insert within the tank and separating the tank into an upper chamber and a lower chamber, the insert including a weir at an upper side of the insert to define an intake area for receiving an influent liquid, a first opening through the insert in the intake area for delivering liquid down into the lower chamber and a second opening through the insert on an opposite side of the weir for delivering liquid from the lower chamber back up into the upper chamber;
a perforated shroud extending downward from the insert within the lower chamber and having a lower end positioned above a bottom of the lower chamber, wherein at least some liquid passes through the perforated shroud as such liquid flows through the lower chamber in order to reach the second opening;
wherein the perforated member includes a central portion positioned toward the first opening and end portions positioned away from the first opening;
wherein the perforated member comprises a flexible material and is mounted to permit some movement under flow conditions through the lower chamber;
wherein the perforated member is located between the first opening and the second opening such that some liquid entering the lower chamber so as to intercept flow from the first opening to the second opening thereby spreading the flow and attenuating stream velocities; and
an upflow pipe extending downward from the second opening into the lower chamber, a bottom of the upflow pipe closed, and at least one opening in a sidewall of the upflow pipe, the opening of the upflow pipe facing away from a location of the first opening such that liquid traveling from the first opening to the second opening enters the upflow pipe in a direction that is in part laterally back toward the first opening.

24. A separator unit, comprising:
a tank defining an internal volume and having an inlet and an outlet;
an insert within the tank and separating the tank into an upper chamber and a lower chamber, the insert including a weir at an upper side of the insert to define an intake area for receiving an influent liquid, a first opening through the insert in the intake area for delivering liquid down into the lower chamber and a second opening through the insert on an opposite side of the weir for delivering liquid from the lower chamber back up into the upper chamber;
an upflow pipe extending downward from the second opening, a bottom of the upflow pipe closed, the upflow pipe includes a tubular wall with a first side facing toward the first opening and a second side facing away from the first opening, wherein the first side is a solid wall configuration and the second side includes at least one opening for permitting liquid to enter the rise pipe to flow up to the second opening.

25. The separator of claim 24 where the second side of the tubular wall includes a slot opening, the slot opening extending through no more than one-hundred eighty degrees.

26. The separator of claim 25 wherein the slot opening has a lower edge at the bottom of the upflow pipe an upper edge positioned below an underside of the insert, with a slot height of no more than thirty-five percent of a radius of the tank.

27. The separator of claim 26 wherein the slot height is substantially equal to twenty-five percent of the radius of the tank.

28. The separator of claim 24, further comprising on or more of:
a perforated shroud extending downward from the insert within the lower chamber and having a lower end positioned above a bottom of the lower chamber, wherein at least some liquid passes through the perforated shroud as such liquid flows through the lower chamber in order to reach the second opening and/or at least one perforated member positioned substantially horizontally in one or more of the lower chamber, atop the drop chute and/or within a vertical extent of the drop chute.

\* \* \* \* \*